United States Patent [19]
Takahashi et al.

[11] Patent Number: 6,078,454
[45] Date of Patent: *Jun. 20, 2000

[54] HEAD ASSEMBLY HAVING A TABLE FOR STORING A HEAD OFFSET AND BIAS CURRENT

[75] Inventors: Tsuyoshi Takahashi, Kawasaki; Toshihiko Matsuda, Higashine; Takehiko Tsuboi; Koji Ikenoya, both of Kawasaki; Yukio Abe; Koji Ishii, both of Higashine; Tomoo Furukawa, Kawasaki; Hiroyuki Kobayashi, Higashine, all of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/573,319

[22] Filed: Dec. 15, 1995

[30] Foreign Application Priority Data

Feb. 10, 1995 [JP] Japan .................................. 7-022431

[51] Int. Cl.$^7$ ...................................................... G11B 5/03
[52] U.S. Cl. ................................................ 360/66; 360/46
[58] Field of Search ................................ 360/46, 66, 75, 360/78.04

[56] References Cited

U.S. PATENT DOCUMENTS

| | | | |
|---|---|---|---|
| 4,802,033 | 1/1989 | Chi | 360/77.04 |
| 5,179,667 | 1/1993 | Iyer . | |
| 5,339,206 | 8/1994 | Takahashi | 360/75 |
| 5,412,518 | 5/1995 | Christner et al. | 366/66 |
| 5,416,646 | 5/1995 | Shirai | 360/46 |
| 5,615,063 | 3/1997 | Kuroki et al. | 360/66 |
| 5,831,782 | 11/1998 | Kohno et al. | 360/66 |

FOREIGN PATENT DOCUMENTS

| | | |
|---|---|---|
| 0287301 | 10/1988 | European Pat. Off. . |
| 04283411 | 10/1992 | Japan . |
| 05182113 | 7/1993 | Japan . |
| 5225509 | 9/1993 | Japan . |
| 5225711 | 9/1993 | Japan . |
| 05325110 | 12/1993 | Japan . |
| 05334607 | 12/1993 | Japan . |
| 06231410 | 8/1994 | Japan . |

*Primary Examiner*—Alan Faber
*Attorney, Agent, or Firm*—Greer, Burns & Crain Ltd.

[57] ABSTRACT

When a combination head is on-tracked to an arbitrary cylinder position, a head position controller corrects a head position so as to eliminate an offset amount derived from an offset table. A bias current setting circuit obtains a current set value corresponding to an offset correction amount from a bias current table and supplies the bias current according to the current set value to an MR head. As kinds of offsets, there are a yaw angle offset, a thermal offset, and a core deviation offset.

12 Claims, 28 Drawing Sheets

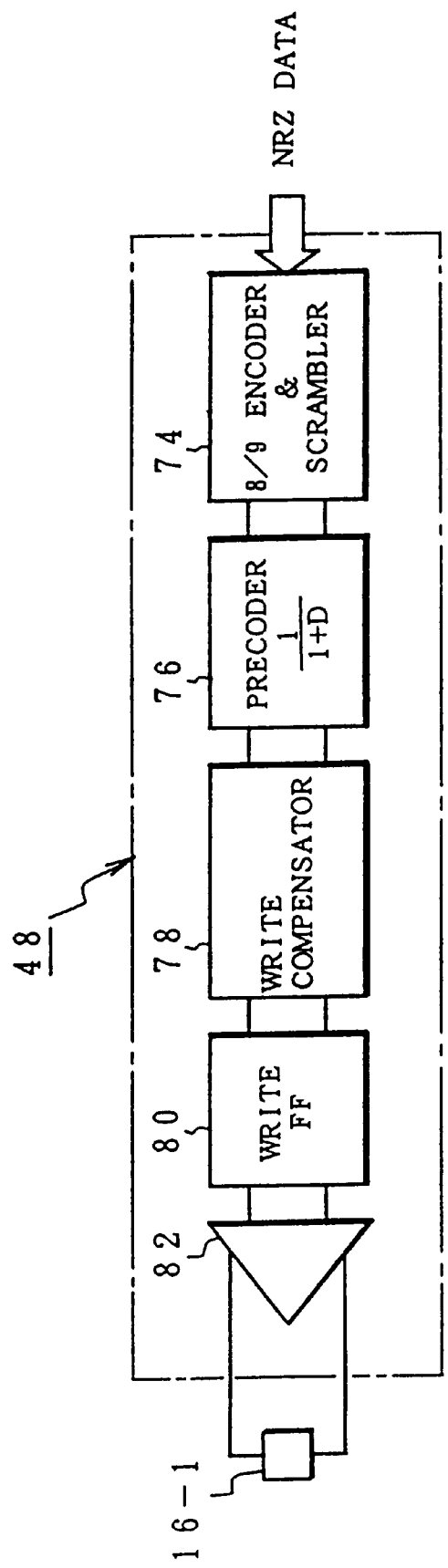
F I G. 4

| CYLINDER ADDRESS \ HEAD NO. | HH-1 | HH-2 | HH-3 | ... | HH-n |
|---|---|---|---|---|---|
| CC-1 | a11+b11+c11 | a21+b21+c21 | a31+b31+c31 | | an1+bn1+cn1 |
| CC-2 | a12+b12+c12 | a22+b22+c22 | a32+b32+c32 | | an2+bn2+cn2 |
| CC-3 | a13+b13+c13 | a23+b23+c23 | a33+b33+c33 | | an3+bn3+cn3 |
| CC-4 | a14+b14+c14 | a24+b24+c24 | a34+b34+c34 | | an4+bn4+cn4 |
| CC-5 | a15+b15+c15 | a25+b25+c25 | a35+b35+c35 | | an5+bn5+cn5 |
| ....... | ........ | ........ | ........ | | ........ |
| CC-n | a1n+b1n+c1n | a2n+b2n+c2n | a3n+b3n+c3n | | ann+bnn+cnn |

$a_{ij}$ : YAW ANGLE OFFSET
$b_{ij}$ : THERMAL OFFSET
$c_{ij}$ : CORE DEVIATION OFFSET

FIG. 9

| HEAD NO. \ TRACK OFFSET AMOUNT | −h | −g | ... | −b | −a | 0 | +a | +b | +c | ... | +f | +g | +h |
|---|---|---|---|---|---|---|---|---|---|---|---|---|---|
| HH−1 | $A_1$ | $B_1$ | | $E_1$ | $F_1$ | $G_1$ | $H_1$ | $I_1$ | $J_1$ | | $P_1$ | $Q_1$ | $R_1$ |
| HH−2 | $A_2$ | $B_2$ | | $E_2$ | $F_2$ | $G_2$ | $H_2$ | $I_2$ | $J_2$ | | $P_2$ | $Q_2$ | $R_2$ |
| HH−3 | $A_3$ | $B_3$ | | $E_3$ | $F_3$ | $G_3$ | $H_3$ | $I_3$ | $J_3$ | | $P_3$ | $Q_3$ | $R_3$ |
| HH−4 | $A_4$ | $B_4$ | | $E_4$ | $F_4$ | $G_4$ | $H_4$ | $I_4$ | $J_4$ | | $P_4$ | $Q_4$ | $R_4$ |
| HH−8 | $A_8$ | $B_8$ | | $E_8$ | $F_8$ | $G_8$ | $H_8$ | $I_8$ | $J_8$ | | $P_8$ | $Q_8$ | $R_8$ |
| HH−9 | $A_9$ | $B_9$ | | $E_9$ | $F_9$ | $G_9$ | $H_9$ | $I_9$ | $J_9$ | | $P_9$ | $Q_9$ | $R_9$ |
| HH−10 | $A_a$ | $B_a$ | | $E_a$ | $F_a$ | $G_a$ | $H_a$ | $I_a$ | $J_a$ | | $P_a$ | $Q_a$ | $R_a$ |
| HH−11 | $A_b$ | $B_b$ | | $E_b$ | $F_b$ | $G_b$ | $H_b$ | $I_b$ | $J_b$ | | $P_b$ | $Q_b$ | $R_b$ |
| HH−12 | $A_c$ | $B_c$ | | $E_c$ | $F_c$ | $G_c$ | $H_c$ | $I_c$ | $J_c$ | | $P_c$ | $Q_c$ | $R_c$ |
| HH−n | $A_n$ | $B_n$ | | $E_n$ | $F_n$ | $G_n$ | $H_n$ | $I_n$ | $J_n$ | | $P_n$ | $Q_n$ | $R_n$ |

| CYLINDER ADDRESS \ HEAD NO. | HH-1 | HH-2 | HH-3 | ... | HH-n |
|---|---|---|---|---|---|
| CC-1 | a11+b11 | a21+b21 | a31+b31 | | an1+bn1 |
| CC-2 | a12+b12 | a22+b22 | a32+b32 | | an2+bn2 |
| CC-3 | a13+b13 | a23+b23 | a33+b33 | | an3+bn3 |
| CC-4 | a14+b14 | a24+b24 | a34+b34 | | an4+bn4 |
| CC-5 | a15+b15 | a25+b25 | a35+b35 | | an5+bn5 |
| ...... | | | ...... | | ...... |
| CC-n | a1n+b1n | a2n+b2n | a3n+b3n | | ann+bnn |

144 aij : YAW ANGLE OFFSET
bij : THERMAL OFFSET

FIG. 25

| CYLINDER ADDRESS \ HEAD NO. | HH-1 | HH-2 | HH-3 | ... | HH-n |
|---|---|---|---|---|---|
| CC-1 | a11+c11 | a21+c21 | a31+c31 | | an1+cn1 |
| CC-2 | a12+c12 | a22+c22 | a32+c32 | | an2+cn2 |
| CC-3 | a13+c13 | a23+c23 | a33+c33 | | an3+cn3 |
| CC-4 | a14+c14 | a24+c24 | a34+c34 | | an4+cn4 |
| CC-5 | a15+c15 | a25+c25 | a35+c35 | | an5+cn5 |
| ...... | | | ...... | | |
| CC-n | a1n+c1n | a2n+c2n | a3n+c3n | | ann+cnn |

136

$a_{ij}$: YAW ANGLE OFFSET
$c_{ij}$: CORE DEVIATION OFFSET

FIG. 26

| HEAD NO.<br>CYLINDER ADDRESS | HH-1 | HH-2 | HH-3 | ... | HH-n |
|---|---|---|---|---|---|
| CC-1 | a11 | a21 | a31 | | an1 |
| CC-2 | a12 | a22 | a32 | | an2 |
| CC-3 | a13 | a23 | a33 | | an3 |
| CC-4 | a14 | a24 | a34 | | an4 |
| CC-5 | a15 | a25 | a35 | | an5 |
| ..... | ........ | ........ | ........ | | ........ |
| CC-n | a1n | a2n | a3n | | ann |

144 aij : YAW ANGLE OFFSET

HEAD ASSEMBLY HAVING A TABLE FOR STORING A HEAD OFFSET AND BIAS CURRENT

BACKGROUND OF THE INVENTION

The present invention relates to a memory apparatus such as a magnetic disk apparatus or the like using an MR head as a read head and, more particularly, to a memory apparatus for correcting an asymmetry of a read waveform of the MR head in association with an offset correction.

In recent years, in the magnetic disk apparatus used as an external memory apparatus, the improvement of a higher recording density, a higher transfer speed, and a higher spindle rotational speed have been realized. Use of a MR head (Magnet-Resistive Head) which can secure a high output level without depending on a rotational speed (circumferential speed) of a disk medium has begun. However, an upper/lower asymmetry which is peculiar to a read waveform exists in the MR head. If there is an upper/lower asymmetry, an error rate upon reading is deteriorated. Such an upper/lower asymmetry of the MR head can be eliminated by adjusting a bias current (sense current) to be supplied to an MR device provided for the MR head.

FIG. 1 shows a curve 112 of ρ-H characteristics (resistivity—magnetic field characteristics) of the MR device. Different operation points 114, 120, and 126 are determined for the curve 112 in accordance with a magnetic field (H) from a disk. Output waveforms 118, 124, and 130 from the MR device are obtained in accordance with changes 116, 122, and 128 in the recording magnetic field (H) at the operation points 114, 120, and 126. In this instance, since the operation point 114 is located in a straight line area in which an inclination of the curve 112 is almost constant, the output waveform 118 which is symmetrical with respect to the upper and lower portions for the magnetic field change 116 is obtained. On the other hand, since the operation point 120 is located in an area in which the inclination of the curve 112 decreases in accordance with a decrease in magnetic field (H), the asymmetric output waveform 124 in which an amplitude is small on the upper side and is large on the lower side is obtained for the magnetic field change 122. Since the operation point 126 is located in an area in which the inclination of the curve 112 increases in accordance with the decrease in magnetic field (H), the asymmetric output waveform 130 in which an amplitude is large on the upper side and is small on the lower side for the magnetic field change 128 is obtained. In this instance, assuming that an amplitude on the upper side of each of the output waveforms 118, 124, 130 is set to A1 and the amplitude on the lower side is set to A2, the upper/lower asymmetry Asym. of the output waveform is defined by the following equation.

$$\text{Asym.} = (A1-A2)/(A1+A2) \times 100 [\%] \quad (1)$$

In FIG. 1, since A1=A2 at the operation point 114, the upper/lower asymmetry Asym.=0% and the asymmetry is eliminated. However, since A1<A2 at the operation point 120 and A1>A2 at the operation point 126, an asymmetry occurs. In order to eliminate such upper/lower asymmetry of the read waveform which is peculiar to the MR head, it is necessary to optimize a bias current flowing into the MR device and to set the operation point of the magnetic field to (H) a proper position. In the magnetic disk apparatus using a conventional MR head, the bias current to be supplied to the MR device in the MR head is adjusted, at a final assembling stage so that the asymmetry Asym. is equal to 0% and the current becomes symmetrical with respect to the upper and lower portions in a state in which the MR head is on-track controlled. A set value of the bias current at which such a read waveform without an upper/lower asymmetry can be obtained is stored in a memory of the apparatus every head. Therefore, at the time of the reading operation when the apparatus is used, the set data of the bias current is read out from the memory in accordance with the head number and the optimized bias current is supplied to the MR head, thereby preventing that the upper/lower asymmetry of the read waveform occurs. As for the adjustment of the bias current, for example, in a state in which the magnetic disk apparatus is connected to a testing machine and the MR head is on-track controlled to a predetermined cylinder position, the asymmetry Asym. according to the equation (1) is measured from the output waveform while adjusting the bias current to be supplied to the MR head. The bias current whose measurement value is equal to 0% is decided and current set data for an A/D converter used for supplying such a bias current is stored in the memory of the apparatus.

According to a servo surface servo method of the magnetic disk apparatus, for example, servo information recorded on a servo surface is read out by a servo head, a combination head integratedly having a write head and a read head is controlled so as to be located at a target cylinder position, and a thermal positional deviation depending on a use temperature or the like of the apparatus exists between tracks at the same cylinder position of the servo surface and data surface. An offset of the head for the track center due to the positional deviation is corrected. That is, at the time of a diagnosing process when the apparatus is power-on-started, the positional deviation is measured and stored into the memory of the apparatus every head number and every cylinder number. At the time of the subsequent on-track control in the reading or writing operation, an offset amount is read out from the memory, and the offset of the combination head is corrected. In the case where the apparatus is used for a long time, further, since an amount of thermal offset which occurs for such a period of time is changed, a calibration to measure the offset is performed at predetermined time intervals, thereby updating the offset amount of the memory.

According to the conventional magnetic disk apparatus using such an MR head, however, although the bias current for eliminating the upper/lower asymmetry of the MR head is measured in a state in which the MR head was on-track controlled, an offset correction of the thermal offset or the like is not executed at this time. At some later point in time, during a reading operation, the offset correction to eliminate the thermal offset is executed by using a result of the measurement of the thermal offset in association with an initial diagnosing process. Therefore, the on-track position of the MR head when the thermal offset is corrected by the reading operation differs from the on-track position used when determining the bias current in accordance with the offset correction amount. As mentioned above, when the MR head is on-track controlled to a position different from the position at which the bias current was decided by the offset correction, the operation point at the time of the actual reading operation is changed for the adjusted operation point 116 in FIG. 1 and the upper/lower asymmetry occurs in the read waveform. When the upper/lower asymmetry appears in the read waveform, so long as a peak detecting method is used in a demodulating circuit of the read waveform, in case of a level detection of a differential waveform after completion of a full-wave rectification, it causes a loss of margin for a slice level and a possibility such that an error rate rises. In the case where a PR4ML (Partial Response Class 4 Maximum Likelihood) method as a level detecting method is used in the demodulating circuit, an equalization error by an equalization occurs because sampling points of the upper and lower waveforms are deviated, so that it similarly becomes a factor to affecting the error rate.

SUMMARY OF THE INVENTION

According to the invention, there is provided a memory apparatus in which an asymmetry of a read waveform which occurs when an offset correction of a track is executed by an on-track control is certainly eliminated, thereby improving an error rate.

When considering a magnetic disk apparatus as an example, a memory apparatus of the invention has a plurality of combination heads each integratedly having a write head using an inductive head and a read head using an MR head. The plurality of combination heads are moved to arbitrary cylinder positions on a plurality of disk media by an actuator. An offset table in which an offset amount from the center of a track has been stored and a bias current table in which a set value of a bias current for eliminating the upper/lower asymmetry Asym. of the read waveform of the MR head for the offset of the combination head has previously been stored are provided for each of the plurality of combination heads.

When a designated combination head is moved and positioned to an arbitrary cylinder position, a head position controller corrects a head position so as to eliminate the offset amount obtained from the offset table. In a state in which the offset of the combination head has been corrected by the head position controller, a bias current supplying circuit obtains a set value of the bias current corresponding to the offset correction amount from the bias current table and supplies the bias current according to the set value to the MR head.

In this instance, a total amount of a plurality of kinds of offset amounts is stored into the offset table. As offset kinds, there are a yaw angle offset, a thermal offset, a core deviation offset, and the like. The yaw angle offset is an offset which is peculiar to an actuator with a rotary structure in which a combination head is attached to an edge of a rotatable arm. Therefore, a yaw angle offset measuring module for measuring a yaw angle offset is provided. The yaw angle offset measuring module measures a deviation amount of a center position in the track direction of the MR head for a center position in the track direction of the write head provided for the combination head as a yaw angle offset amount for the yaw angle which is decided by each cylinder position by the rotation of the arm and stores into the offset table.

A thermal offset measuring module for measuring a thermal offset indicative of a positional deviation of the combination head depending on an environment temperature of the apparatus and for storing it into the offset table is also provided. In case of providing the thermal offset measuring module, servo information to detect a position of the combination head on a data surface has previously been recorded on a track at a cylinder position (outer guard band area) on the outer circumferential side of each of the data surfaces of the disk medium. In a state in which the combination head was moved and positioned to a recording cylinder position of the servo information on the data surface on the basis of the servo information of the servo surface by the servo head, the thermal offset measuring module detects a head position on the basis of the servo information read out from the MR head and stores the head position as a thermal offset amount (b) into the offset table. The core deviation offset measuring module measures a deviation amount of the center position of the MR head from the center position of the write head as a core deviation offset amount and stores it into the offset table.

The offset amount to be stored into the offset table is measured at a predetermined timing. For example, the offset amount is measured at a proper timing such as timing for activation of the apparatus, timing for turn-on of a power supply, waiting time of a command from an upper apparatus timing, when the number of use times reaches a predetermined value or more timing, when a use time is equal to or longer than a predetermined time, same timing as the calibration, or the like. The offset amount can be also measured at any timing other than the above timings.

The magnetic disk apparatus of the invention further has a head assembly formed by integratedly assembling the actuator, the combination head, and a circuit unit around the head. With respect to the head assembly, according to the invention, a non-volatile memory of the circuit unit is provided and is allowed to store and hold information which is peculiar to the head. For example, the offset amount peculiar to the head is measured and previously stored into the non-volatile memory. That is, a yaw angle offset amount and a core deviation offset amount are previously measured and stored for every head. In the case where the MR head is provided as a read head for the combination head, a set value of the bias current to be supplied in order to eliminate the upper/lower asymmetry of the read waveform in accordance with the offset correction amount of the MR head is measured and previously stored into the non-volatile memory of the circuit unit of the head assembly. A detection value of a position sensitivity of every combination head can be also stored into the memory.

Data to be stored in the non-volatile memory of the circuit unit is measured at a predetermined timing. For example, the data is first measured and stored at the assembling stage of the apparatus (a period). After that, the data may be measured at various times such as upon activation of the apparatus, upon powering on of the power supply, during a command waiting time from an upper apparatus, when the number of use times reaches a predetermined number of times or more, when the use time is equal to or longer than a predetermined time, during calibration, or the like.

According to the memory apparatus of the invention as mentioned above, the bias current is determined in accordance with the offset correction amount at the time of the on-track control is supplied to the MR head, so that the upper/lower asymmetry of the read waveform is eliminated and an error rate can be improved. That is, the bias current to set the asymmetry Asym. of the output waveform to 0% for a change in offset amount of the MR head is measured at a manufacturing stage of the apparatus and its current set data is stored as a bias current table into the memory.

According to the data surface servo method, the yaw angle offset amount, thermal offset amount, and core deviation offset amount are previously measured every head and are stored as an offset table into the memory. The offset amount which is stored as a table in this case is a total amount of three offsets. In accordance with the offset amount of the offset table which is used in the offset correction of the on-track control upon reading operation, corresponding current set data is read out from the bias current table, the bias current is supplied to the MR head, and the read waveform from which the upper/lower asymmetry was eliminated can be obtained.

On the other hand, according to the data surface servo method the yaw angle offset amount and core deviation offset amount are measured, and a total amount of the offset is stored into the offset table. Current bias data is read out from the bias current table in accordance with the total offset amount and is supplied to the MR head thereby eliminating the upper/lower asymmetry eliminated can be obtained. Data such as offset, bias current set data, position sensitivity detection value, or the like of each combination head is stored and held in the circuit unit of the head assembly, so that an assembling adjustment in the head assembly can be realized at a stage before assembling with a controller. In this case, since a parameter peculiar to the head exists on the assembly side, the offset correction, setting of the bias current to eliminate the upper/lower asymmetry of the MR head, setting of the position sensitivity, and the like can be performed without being restricted on the controller side. In the case where there is an abnormality on the control unit side at an examination stage, a head assembly without a problem is removed and can be easily assembled with another control unit.

The above and other objects, features, and advantages of the present invention will become more apparent from the following detailed description with reference to the drawings.

BRIEF DESCRIPTION OF THE DRAWINGS

FIG. 4 is a block diagram of a data modulating circuit in FIG. 2;

FIG. 8 is an explanatory diagram of an offset table of the invention;

FIG. 9 is an explanatory diagram of a bias current table of the invention;

FIG. 10 is an explanatory diagram of an offset table which is used in a writing operation;

FIG. 25 is an explanatory diagram of an offset table for reading which is used in FIG. 24;

FIG. 26 is an explanatory diagram of an offset table for writing which is used in FIG. 24;

DETAILED DESCRIPTION OF THE PREFERRED EMBODIMENTS

Figure 2:
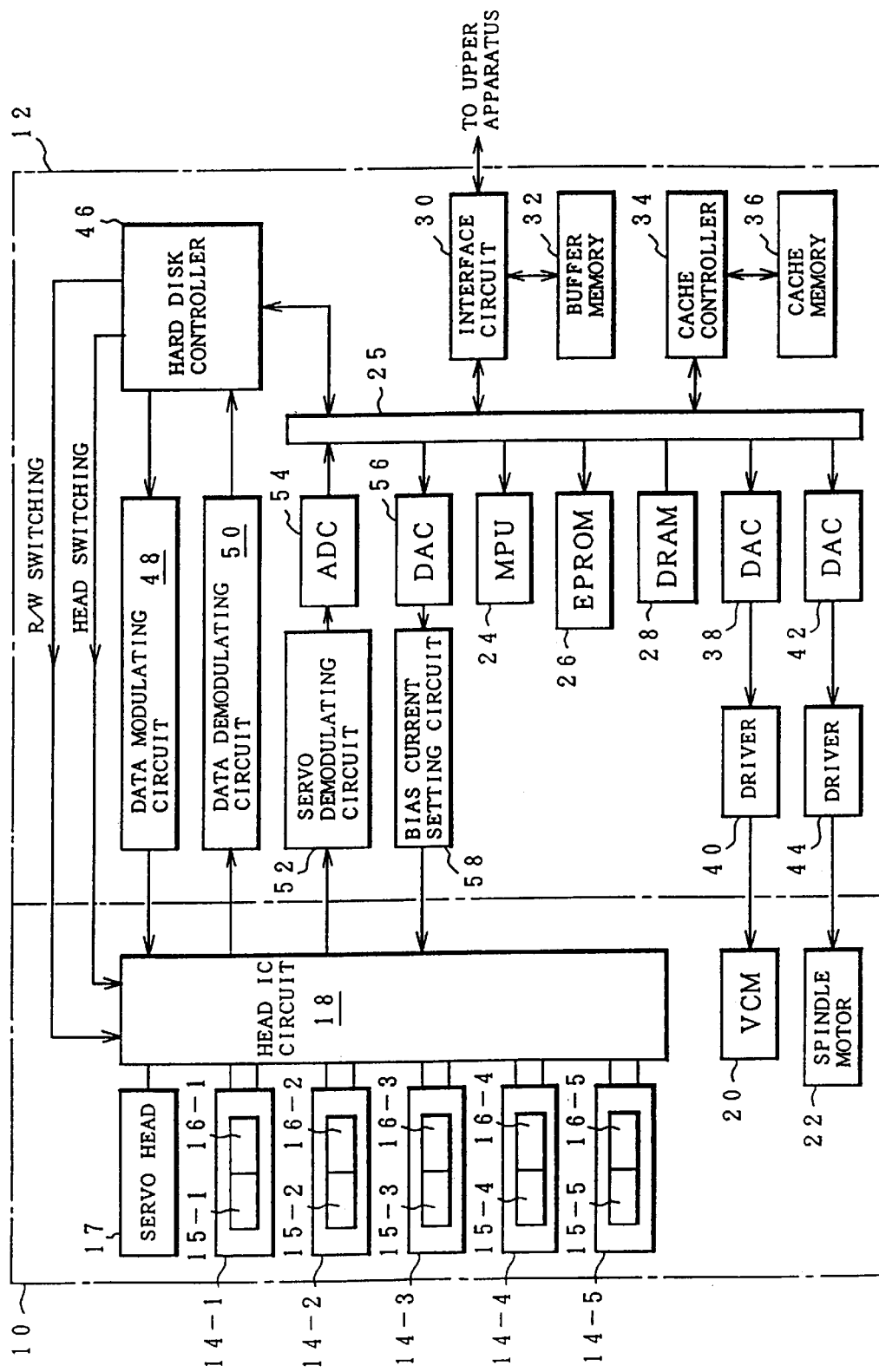
FIG. 2 is a block diagram of an embodiment of the invention according to a servo surface servo method.
Figure 28:
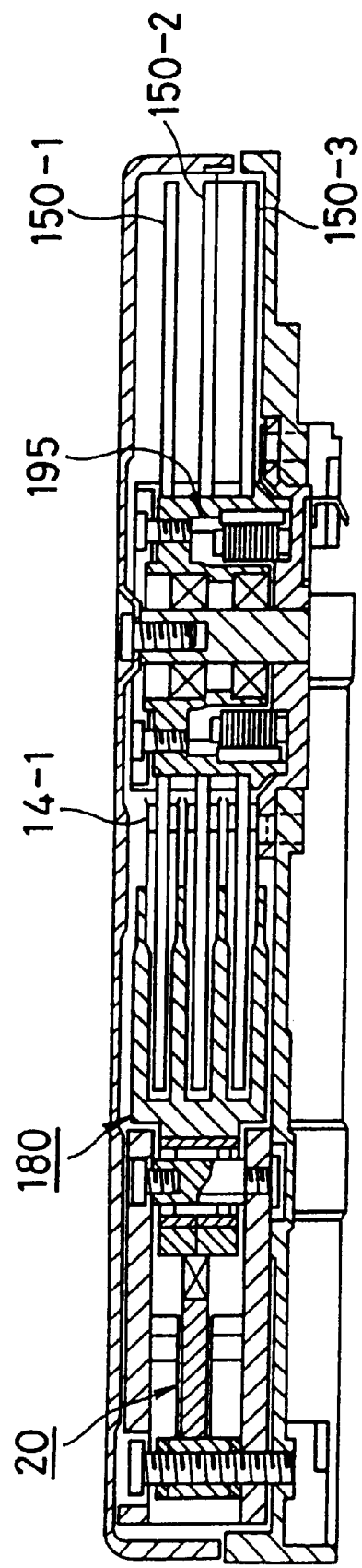
FIG. 28 is a cross sectional view taken along the line I—I in FIG. 27.

FIG. 2 is a whole circuit block diagram in the case where a magnetic disk apparatus is used as an example as a memory apparatus of the invention. The magnetic disk apparatus comprises a disk enclosure 10 and a drive controller 12. As shown in FIG. 28, which will be clearly understood hereinlater, for example, three disks 150-1 to 150-3 are provided for the disk enclosure 10. Since the embodiment relates to a servo surface servo method as an example, five surfaces among six disk surfaces are used as data surfaces and the remaining one disk surface is used as a servo surface. Therefore, combination heads 14-1 to 14-5 are provided in correspondence to the five data surfaces of the disks and a servo head 17 is provided in correspondence to the servo surface for the disk enclosure 10. MR heads 15-1 to 15-5 which are used as read heads and write heads 16-1 to 16-5 using inductive heads are integratedly provided for the combination heads 14-1 to 14-5. The MR heads 15-1 to 15-5 and write heads 16-1 to 16-5 are connected to a head IC circuit 18, thereby switching the heads and supplying a bias current to the MR head selected upon reading. A spindle motor 22 for rotating the disk and a VCM 20 for positioning the head are also provided for the disk enclosure 10. An MPU 24 which functions as a control section is provided for the drive controller 12. A read only EEPROM 26 which is used as a program memory and a writable DRAM 28 are provided for a bus 25 of the MPU 24. An interface circuit 30 and a buffer memory 32 for data transfer are further provided for the bus 25 of the MPU 24. As an interface circuit 30, for example, a SCSI is used and transmits or receives commands and data to/from an upper apparatus. Further, a cache controller 34 and a cache memory 36 are provided. The spindle motor 22 provided for the disk enclosure 10 is controlled by a PWM circuit 42 and a driver 44. A head positioning control of the VCM of the disk enclosure 10 is performed by a D/A converter 38 and a driver 40. In any case, the spindle motor 22 is driven and the head positioning control of the VCM is performed by a program control by the MPU 24. In order to execute a writing operation for the disk on the disk enclosure 10 side, a data modulating circuit 48 is provided. A data demodulating circuit 50 is provided in order to perform a reading operation. The data modulating circuit 48 and data demodulating circuit 50 transfer data to the buffer memory 32 via a hard disk controller 46. The hard disk controller 46 switches the reading and writing operations for the head IC circuit and selects the head. A servo demodulating circuit 52 to demodulate a head position from servo information from the servo surface read out by the servo head 12 provided for the disk enclosure 10 is further provided for the drive controller 12. A head position signal obtained by the servo demodulating circuit 52 is supplied to the MPU 24 through an A/D converter 54 and is used for the head positioning control. A bias current setting circuit 58 is provided for supplying a bias current (sense current) to decide an operating point of the bias current upon a reading operation of either one of the MR heads 15-1 to 15-5. Bias current set data determined on the MPU 24 side is converted to an analog voltage by a D/A converter 56 and is supplied to the bias current setting circuit 58. The bias current setting circuit 58 supplies the bias current corresponding to an output voltage of the D/A converter 56 to the MR head.

Figure 1:
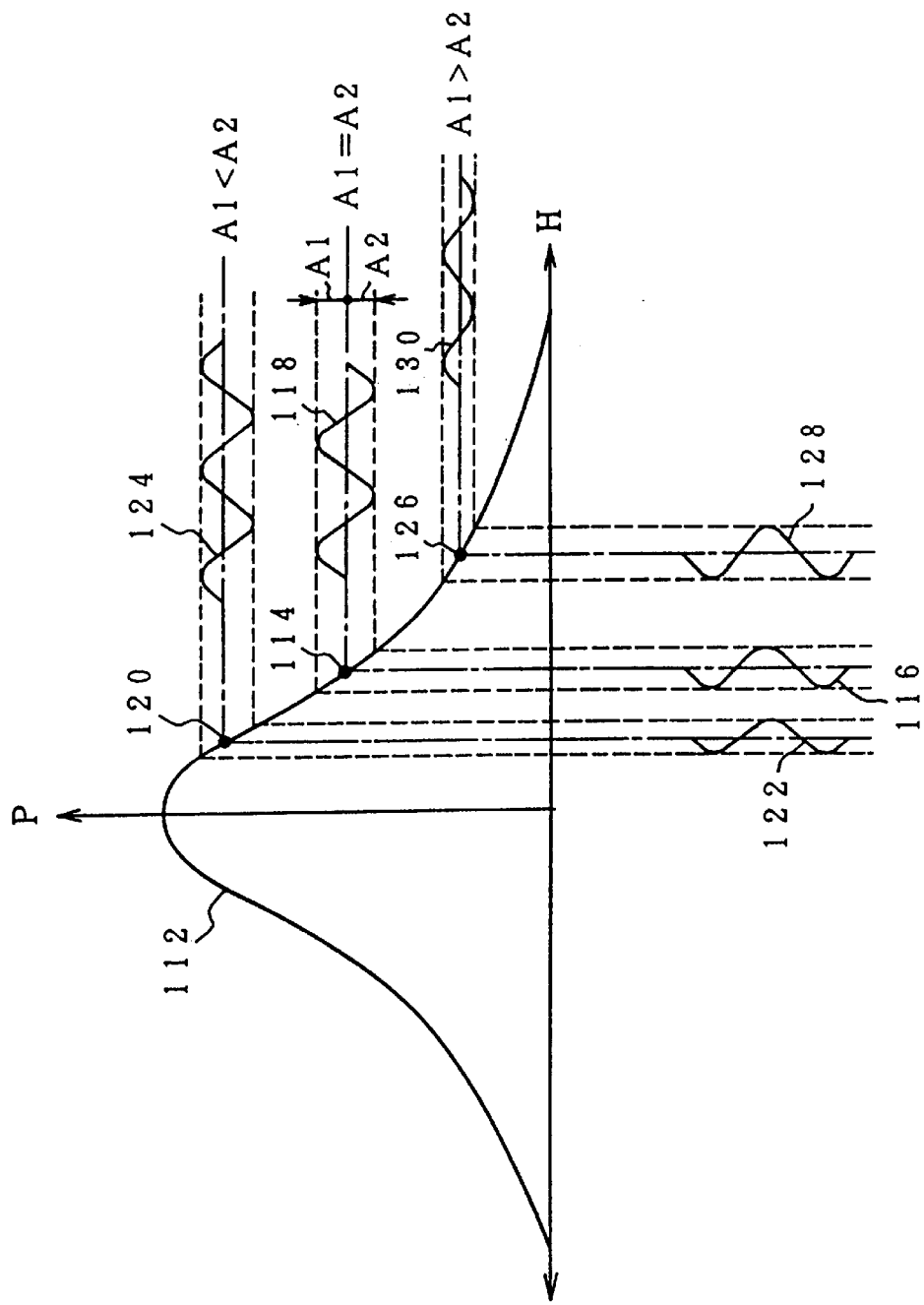
FIG. 1 is a characteristics diagram of ρ-H characteristics and operating points of an MR head.
Figure 3:
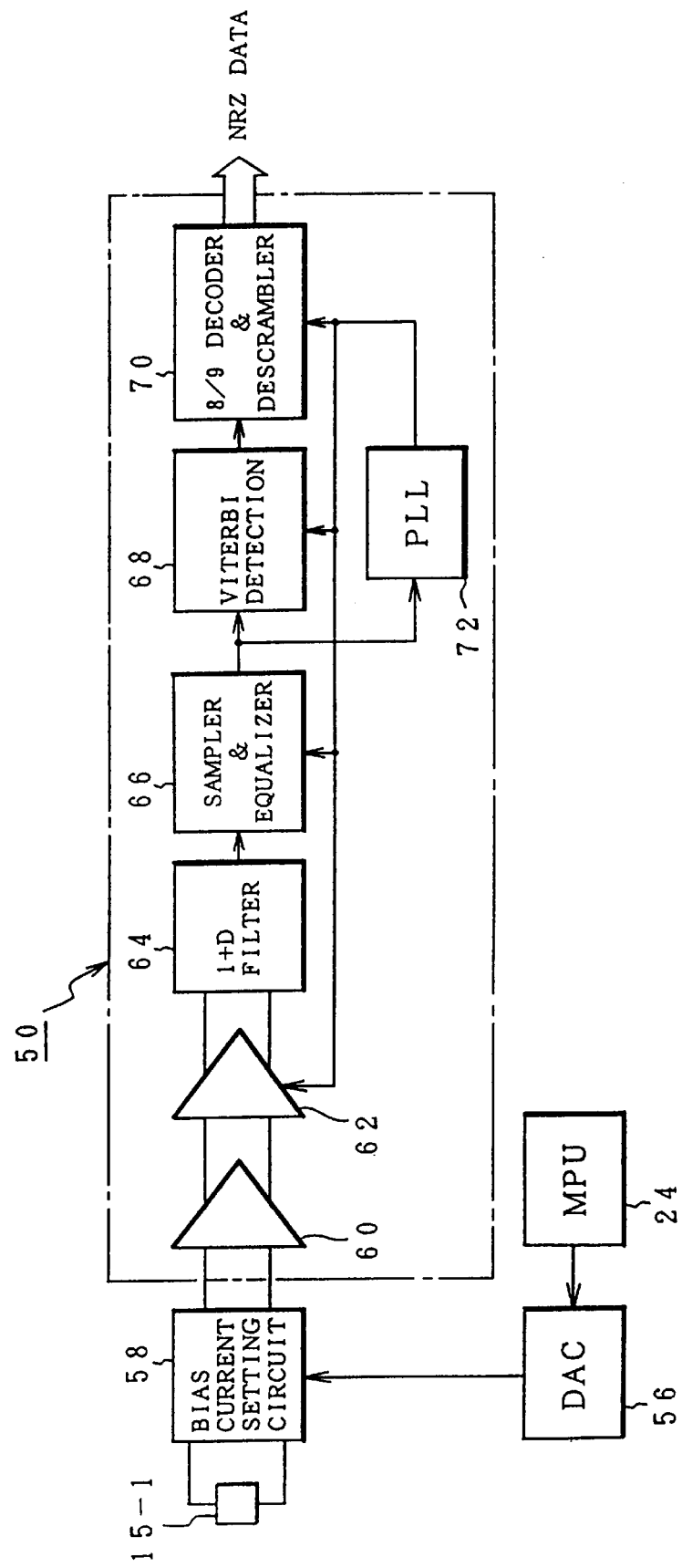
FIG. 3 is a block diagram of a data demodulating circuit in FIG. 2.

FIG. 3 is a block diagram of the data demodulating circuit 50 provided for the drive controller 12 in FIG. 2 and a PR4ML method as a level detecting method is used. In this instance, a state in which the MR head 15-1 is selected is shown by a fixed connecting state with respect to the disk enclosure side. In this state, an instructed voltage based on an instruction of the MPU 24 is applied from the D/A converter 56 to the bias current setting circuit 58. An optimum bias current such that an output waveform from which the upper/lower asymmetry is eliminated as shown at the operation point 114 in FIG. 1 is supplied to the MR head 15-1. A reproduced signal from the MR head 15-1 is passed to the data demodulating circuit 50 for equalizing a waveform of the PR4ML method. Prior to the PR4 equalization, and subsequent to amplification by a fixed amplifier 60 and an AGC amplifier 62, an analog filtering process is performed by a (1+D) filter 64. There is subsequently provided a sampler & equalizer 66 to sample an analog output signal of the (1+D) filter 64 at a period corresponding to a recording frequency, to convert it to digital data, and to equalize the sampled waveform data by the PR4 equalization. A data train which was subjected to the PR4 equalization by the sampler & equalizer is supplied to a Viterbi detecting circuit 68, thereby detecting the most likelihood data train in accordance with an algorithm of the most likelihood method. The data train detected by the Viterbi detecting circuit 68 is subjected to an 8/9 run-length inverse conversion and a descrambling process for returning to the original data train by an 8/9 decoder & descrambler 70 and is outputted as NRZ data which is final read data. A PLL circuit 72 forms a clock signal by a PLL operation synchronized with a pulse train of a equalized output of the sampler & equalizer 66, thereby obtaining a clock synchronization of the AGC amplifier 62, sampler & equalizer 66, Viterbi detecting circuit 68, and 8/9 decoder & descrambler 70.

FIG. 4 is a block diagram of the data demodulating circuit 48 in FIG. 2. The demodulating circuit 48 demodulates data corresponding to the PR4ML method in FIG. 3 at the time of the writing operation. That is, the NRZ data is scrambled in order to convert to pseudo random data by an 8/9 encoder & scrambler 74, converted to an 8/9 run-length code, and converted to transmission characteristics 1/(1+D) suitable to a magnetic disk transmission system by a precoder 76. An output of the precoder 76 is adjusted to compensate for a write current by a write compensator 78. A write flip-flop circuit 80 performs a flip-plop operation according to the data train and a write driver 82 is driven, thereby magnetically recording the data onto a data surface of the disk by the write head 16-1. Although the data demodulating circuit 50 in FIG. 3 and the data modulating circuit 48 in FIG. 4 have been described as an example with respect to the case where the PR4ML method as a level detecting method is used, a conventional peak detecting method can be also used.

Figure 5:
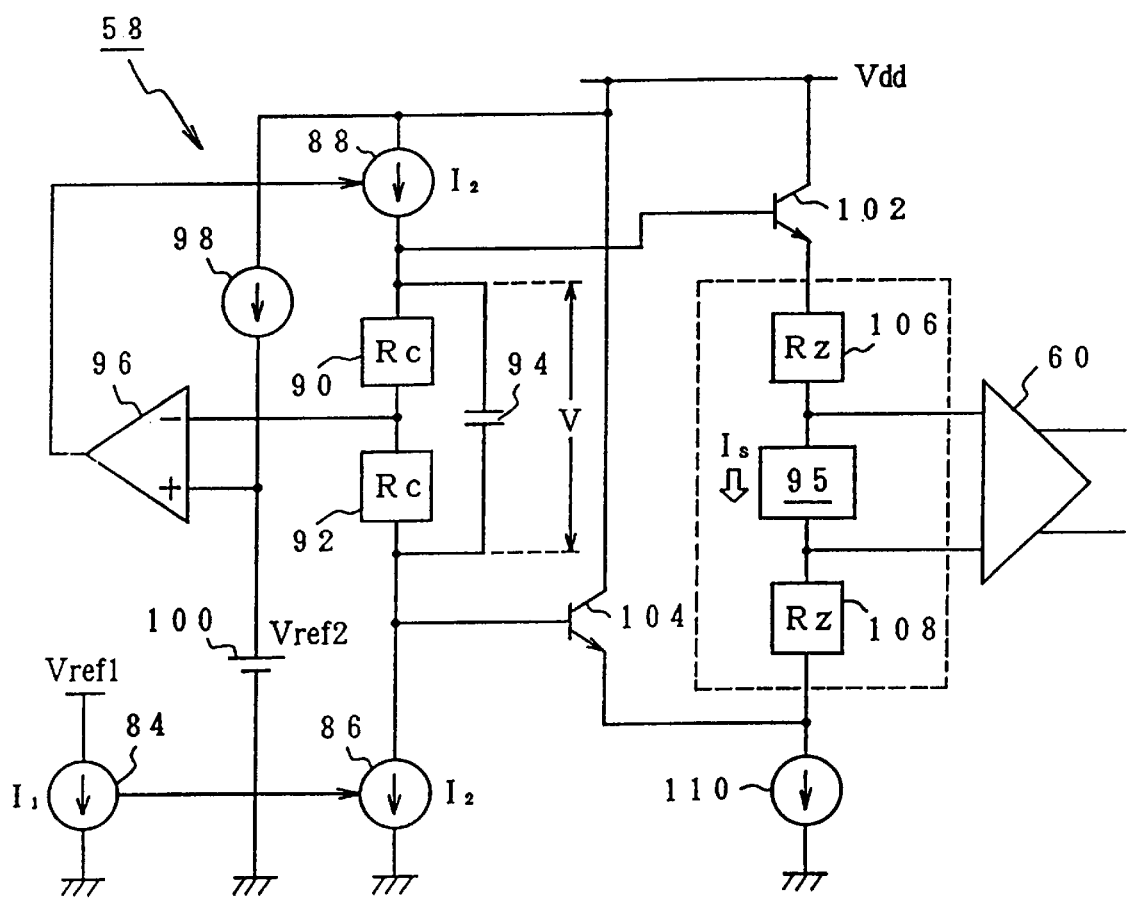
FIG. 5 is an equalizing circuit diagram of a bias current supplying circuit in FIG. 2.

FIG. 5 is an equalizing circuit diagram of the bias current setting circuit 58 in FIG. 2. A current source 84 produces a current $I_1$ which is supplied by the D/A converter 56 in FIG. 2. The current $I_1$ produced by the current source 84 as an output current of a D/A converter 56 controls a current $I_2$ flowing into a current source 86. A current source 88 and resistors 90 and 92 are serially connected between the current source 86 and a power source $V_{dd}$. A connecting point of the resistors 90 and 92 is connected to a (−) input terminal of an operational amplifier 96. A reference voltage $V_{ref2}$ by a current source 98 and a reference voltage source 100 is supplied to a (+) output terminal of the operational amplifier 96. The current source 88 is controlled by an output of the operational amplifier 96. Further, a capacitor 94 is connected to the resistors 90 and 92 in parallel. As resistors 90 and 92, resistors each having a same resistance value R1 are used. When the current $I_1$ of the constant current source 84 as an output current of the D/A converter 56 is controlled, the current $I_2$ of the constant current source 86 is changed. The operational amplifier 96 controls the current source 88 so that a potential of the connecting point of the resistors 90 and 92 always coincides with the reference voltage $V_{ref2}$ of the reference voltage source 100. A voltage $V_1$ across a serial circuit of the resistors 90 and 92 is determined by such a current $I_2$ flowing into the constant current source 86. Such a voltage is generated as a voltage charged in the capacitor 94. The voltage $V_1$ across the capacitor 94 is applied to both terminals of the MR head 15 through transistors 102 and 104. In the MR head 15, resistors 106 and 108 are connected to the upper and lower sides of an MR device 95 and, further, a current source 110 is connected to the outside. As resistors 106 and 108, resistors each having a same resistance value R2 are used. Both terminals of the MR device 95 are connected to two inputs of the fixed amplifier 60. The fixed amplifier 60 is used as an input of the data demodulating circuit 50 as shown in FIG. 3. A bias current (sense current) $I_s$ flowing into the MR device 95 is gain adjusted so as to be α times as large as the current $I_1$ which is supplied by the D/A converter 56 shown by the current source 84. That is, the bias current $I_s$ is given by the following equations.

$$I_s = V_1/(2R_2 + R_1)$$

$$I_s = \alpha \times I_1$$

Figure 6:
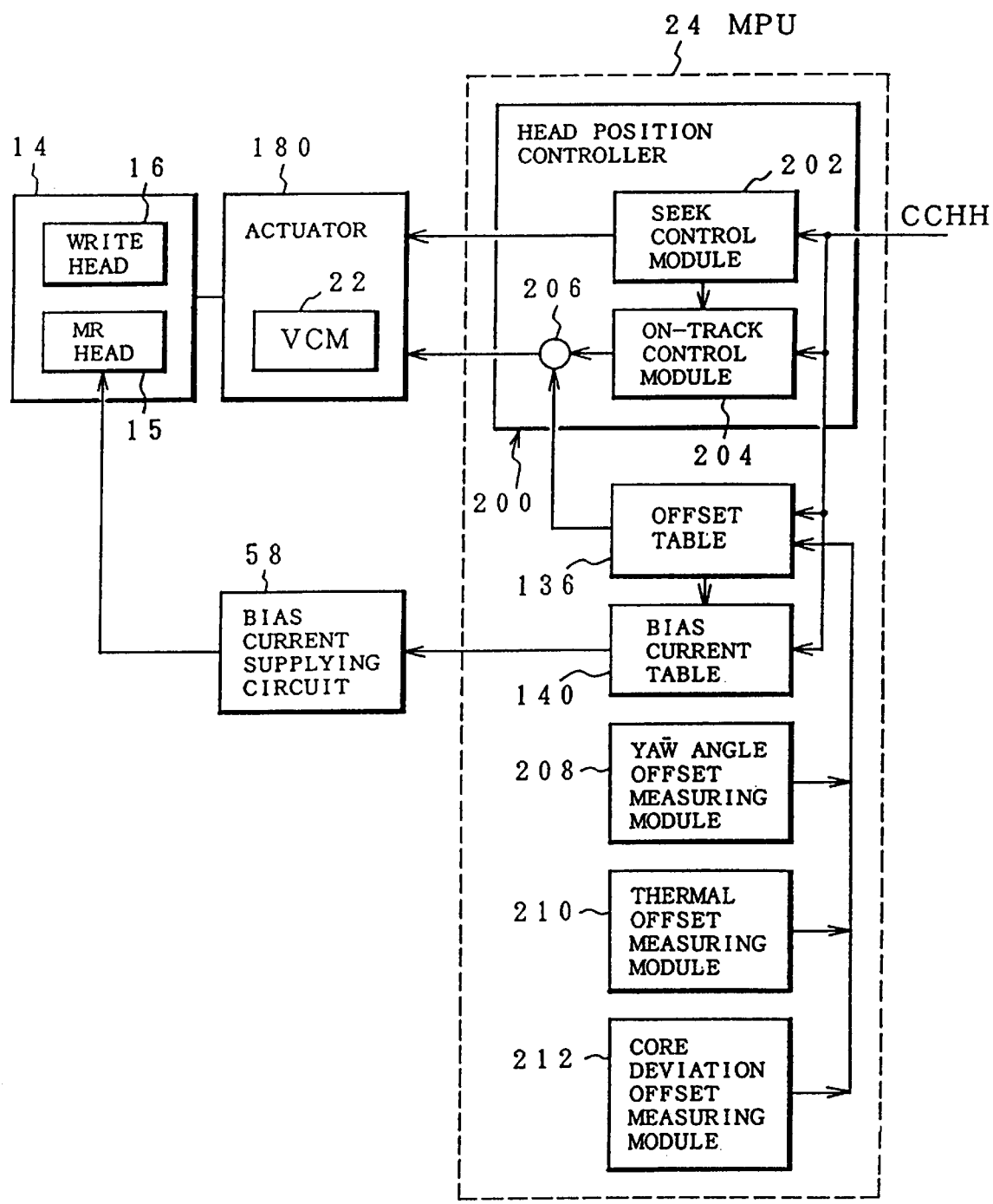
FIG. 6 is a functional block diagram of the invention.

FIG. 6 shows a setting function of the bias current which is realized by the MPU 24 in FIG. 2 and is used to eliminate the upper/lower asymmetry of the MR head in accordance with the offset correction amount in the magnetic disk apparatus of the invention. A head position controller 200 is constructed by a program control of the MPU 24. The head position controller 200 includes a seek control module 202 and an on-track control module 204. When a seek command is received, the combination head 14 and a target cylinder address are selected on the basis of a cylinder number CC and a head number HH obtained from the seek command. The seek control module 202 allows an actuator 180 to seek the combination head 14 to a target cylinder position by the driving of the VCM 20. When the combination head 14 reaches the target cylinder position, the operation is switched to an on-track control by the on-track control module 204. In this instance, an offset correction is executed. Namely, an offset amount corresponding to the designated head number and cylinder address is read out from an offset table 136, an addition/subtraction operation is performed at an adding point 206 so as to correct such an offset amount, and the actuator 180 is made operative by the VCM 20, thereby moving the combination head 14 to such a direction as to eliminate the offset amount. In case of the data surface servo method in FIG. 2, a total offset value obtained by adding the values of the yaw angle offset, thermal offset, and core deviation offset has been stored in the offset table 136. The offsets to be stored in the offset table 136 are measured by a yaw angle offset table measuring module 208, a thermal offset measuring module 210, and a core deviation offset measuring module 212, respectively. With respect to the measurements of the offsets by the yaw angle offset table measuring module 208 and core deviation offset measuring module 212, the measuring process is executed in an adjusting step at a final manufacturing stage of the disk apparatus of the invention and the measured offsets are stored into the offset table 136. The thermal offset measuring module 210 is activated at the time of an initialization diagnosing process just after the power source was turned on to use the apparatus, thereby measuring the thermal offset. After that, the thermal offset measuring module 210 is activated each time a predetermined period of time elapses and measures the thermal offset, thereby updating a value of the offset table 136. As for the yaw angle offset table measuring module 208 and core deviation offset measuring module 212, in a manner similar to the thermal offset measuring module 210, it is also possible to execute the measuring process of each offset at the time of the initialization diagnosing process when starting the use of the apparatus and to store into the offset table 136.

FIG. 8 shows a specific example of the offset table 136 in FIG. 6. The offset table 136 has two-dimensional addresses comprising head numbers HH-1 to HH-n and cylinder addresses CC-1 to CC-n. A total offset value (aij+bij+cij) obtained by adding a yaw angle offset aij, a thermal offset bij, and a core deviation offset cij is stored in an area designated by those addresses. A unique yaw angle offset $a_{ij}$ is determined for each cylinder address for each data head. For example, considering head No. HH-1, yaw angle offsets $a_{l1}$ through $a_{ln}$ have different values with respect to cylinder addresses CC-1 to CC-n. Therefore, so long as the head numbers HH-1 to HH-n are identical in the address, the yaw angle offsets aij have the same value. Thus, for head HH-1, yaw angle offsets a11, a12, a13, a1n are all identical. Similarly, the core deviation offset cij has a fixed value for a given head. So long as the head numbers HH-1 to HH-n are identical, the same value is obtained with respect to the cylinder addresses CC-1 to CC-n. For example, as for the head number HH-1, although the core deviation offsets are shown by c11 to c1n with respect to the cylinder addresses CC-1 to CC-n, they are the same value. The thermal offset bij has a peculiar value depending on the head number and cylinder address. With respect to the cylinder address, further, in case of using a zone bit recording method (Constant Density Recording Method) for the magnetic disk apparatus, it is sufficient that the offset table 136 stores the offset value every cylinder zone instead of the cylinder address.

Referring to FIG. 6 again, a bias current table 140 is provided for the MPU 24. For example, as shown in FIG. 9, set data $A_1$ to $R_n$ of the bias current is stored in the bias current table 140 by using the head numbers HH-1 to HH-n and the track offset amounts 0 to ±h as two-dimensional addresses. Each of the bias current set data $A_1$ to $R_n$ to be stored in the bias current table 140 is obtained by using a tester at an assembling stage of the magnetic disk apparatus of the invention. Namely, the magnetic disk apparatus is connected to the tester and an on-track state in which the offset is equal to 0 with respect to each combination head is formed while switching the combination head by the head number. In this state, the set data of the bias current in which the upper/lower asymmetry Asym.=0%, namely, the set data for the D/A converter 56 in FIG. 2 is obtained. For example, when the head number is HH-1, the data is stored like current set data $G_1$ in the bias current table 140 of FIG. 9. Subsequently, while offsetting the combination head with respect to the track offset amounts ±a to ±h, similarly, an adjusting state of the bias current in which the upper/lower asymmetry Asym. of the read waveform is set to 0% is formed. For example, when the head number is HH-1, the current set data $A_1$ to $F_1$ is stored with respect to the offsets −h to −a. The current set data $H_1$ to $R_1$ is stored with respect to the offsets +a to +h. In this instance, the bias current table of FIG. 9 stores the current set data of each bias current when the track offset amount is changed within a range of 0 to ±h with respect to the head numbers HH-1 to HH-n. On the other hand, in case of using the zone bit recording method (Constant Density Recording Method) as a magnetic disk apparatus, the head numbers HH-1 to HH-n are further divided by the zone numbers of the cylinder, and the current set data of the bias current for the track offset amount can be also similarly obtained and stored.

Referring to FIG. 6 again, when the offset correction of the combination head 14 is performed by using the offset value of the offset table 136 by the head position controller 200, the corresponding current set data of the bias current table 140 is read out on the basis of the designated head number HH and the offset correction amount obtained from the offset table 136. The bias current corresponding to the current set data is supplied to the MR head 15 by the bias current setting circuit 58. Therefore, in the reading operation, the offset correction is performed by the on-track control of the combination head 14, even if the MR head 15 is offset to a position different from the head position at the time of the formation of the bias current table 140, a bias current at the operation point from which the upper/lower asymmetry suitable to such an offset amount was eliminated is supplied. Therefore, the upper/lower symmetry of the output waveform from the MR head 15 is not broken even when the offset correction is executed.

Figure 7:
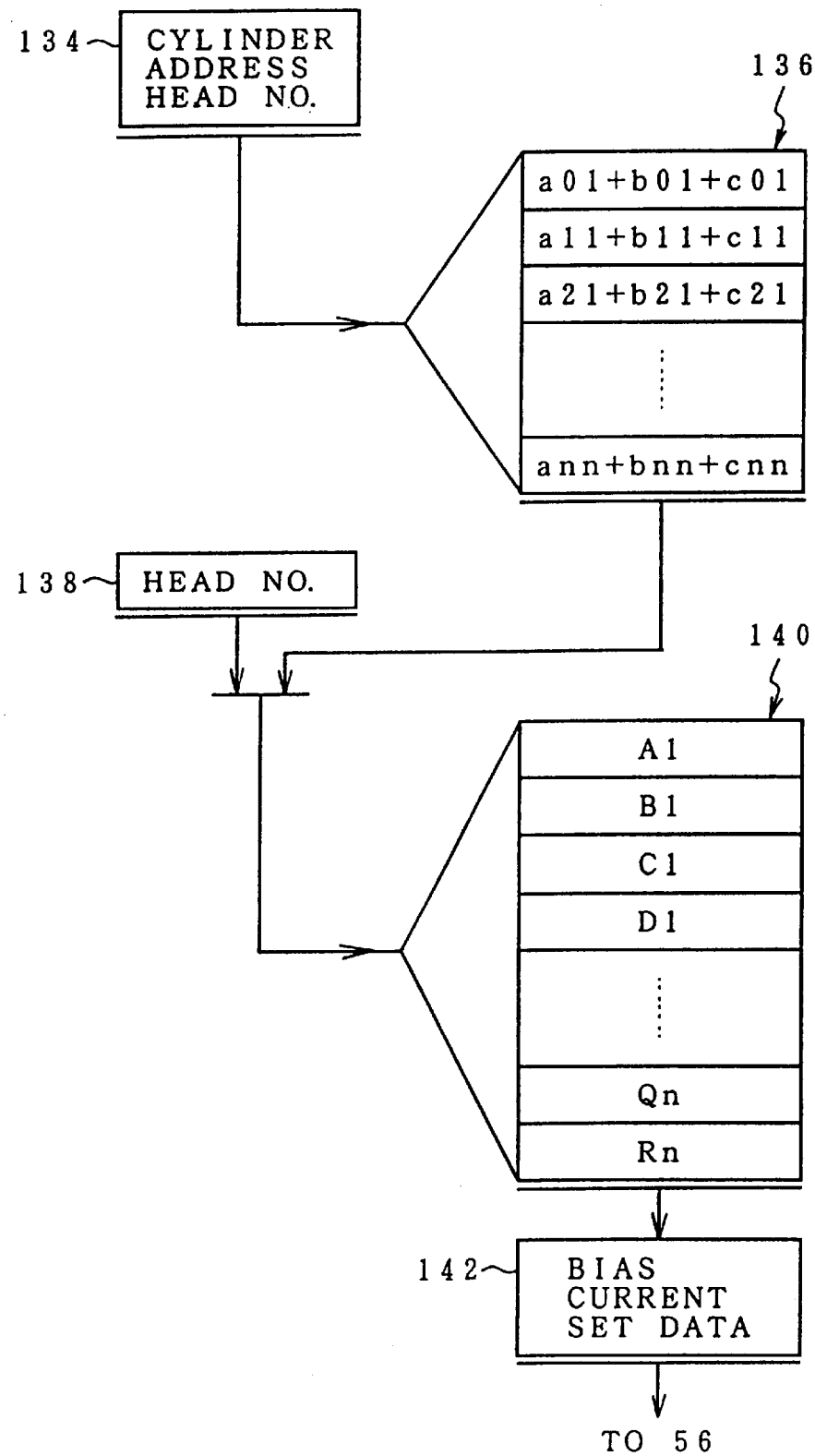
FIG. 7 is an explanatory diagram of a table function for reading out an offset amount and bias current set data of the invention.

FIG. 7 shows a converting function of the bias current set data by the offset table 136 and bias current table 140 provided for the MPU 24 in FIG. 6. The cylinder address CC and head number HH at which the on-track control is performed are set in a register 134. The offset amount as a total amount of the yaw angle offset, thermal offset, and core deviation offset is read out from the offset table 136 by using the cylinder address CC and head number HH as an entry. The offset amount read out from the offset table 136 is synthesized with the head number HH of a register 138, thereby forming an entry of the bias current table 140. The corresponding bias current set data is read out from the bias current table 140 and is stored into a register 142. The bias current set data of the register 142 is inputted to the D/A converter 56. As shown in the equalizing circuit of FIG. 5, the bias current (sense current) $I_s$ which is α times as large as the current $I_1$ corresponding to the current set data by the D/A converter 56 flows to the MR device 95. Therefore, the head reading operation in which the upper/lower asymmetry Asym. of the read waveform is set to 0% can be performed for the head movement based on the offset correction amount.

FIG. 10 shows an offset table 144 which is used in the writing operation of the magnetic disk apparatus of the invention. In the writing operation, the write head provided for the combination head is used. Since a core deviation offset as in the MR head for reading doesn't exist, an offset value obtained by adding the yaw angle offset aij and thermal offset bij is stored into the table and is used for the on-track control.

Figure 11:
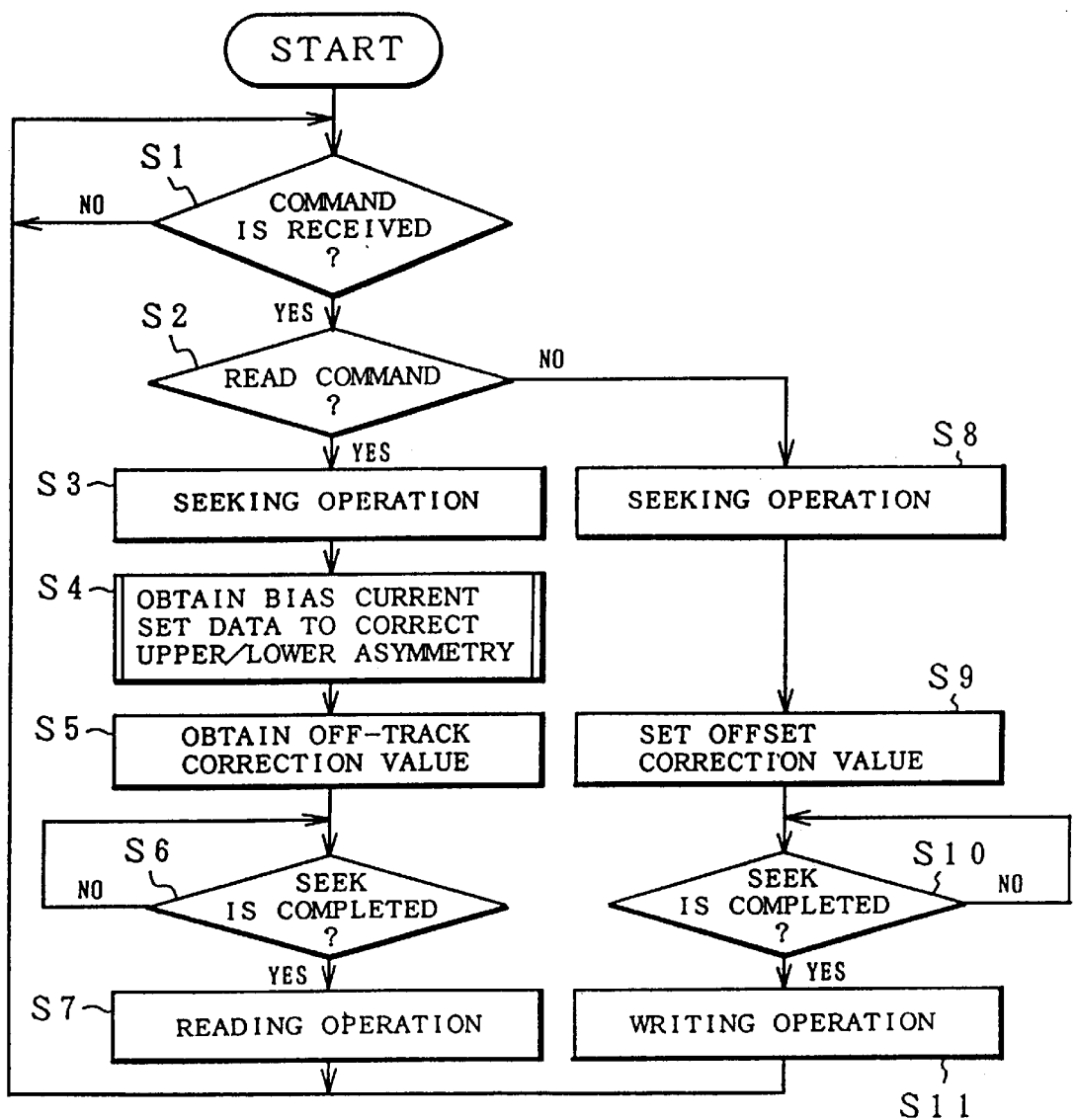
FIG. 11 is a flowchart for a whole processing operation according to the invention.

A flowchart of FIG. 11 shows a whole process of the magnetic disk apparatus of the invention. First in step S1, a check is made to see if a command has been received from an upper apparatus or not. If YES, step S2 follows and a check is made to see if it is a read command or not. If YES, a seeking operation to the designated cylinder address is executed in step S3. In step S4, the offset table 136 is referred by the cylinder number CC and head number HH designated by the upper apparatus, thereby reading out the corresponding offset amount. The current set data is obtained with reference to the bias current table 140 on the basis of the read-out offset amount and the designated head number HH. A setting process of the bias current to correct the upper/lower asymmetry is executed. Subsequently, in step S5, the offset correction value obtained by the offset table 136 is set. The setting of the bias current set data in step S4 and the setting of the offset correction value in step S5 are the setting processes in the MPU 24. An operation to output to the outside is not executed at this stage. When the seeking operation is completed in step S6, since the operation is switched to the on-track control, the bias current set data obtained in step S4 is supplied to the D/A converter 56 and the supply of the bias current to the MR head is started. The offset correction set in step S5 is also executed by the on-track control and, in such a state, the reading operation is executed in step S7. On the other hand, when it is judged that the input command is the write command in step S3, the seeking operation to the designated cylinder address is executed in step S8. In step S9, the offset table 144 for writing in FIG. 10 is referred by using the cylinder address CC and head number HH, thereby setting the offset correction value. After completion of the seeking operation in step S10, the writing operation is started while executing the offset correction at the time of the on-track control in step S11.

Figure 12:
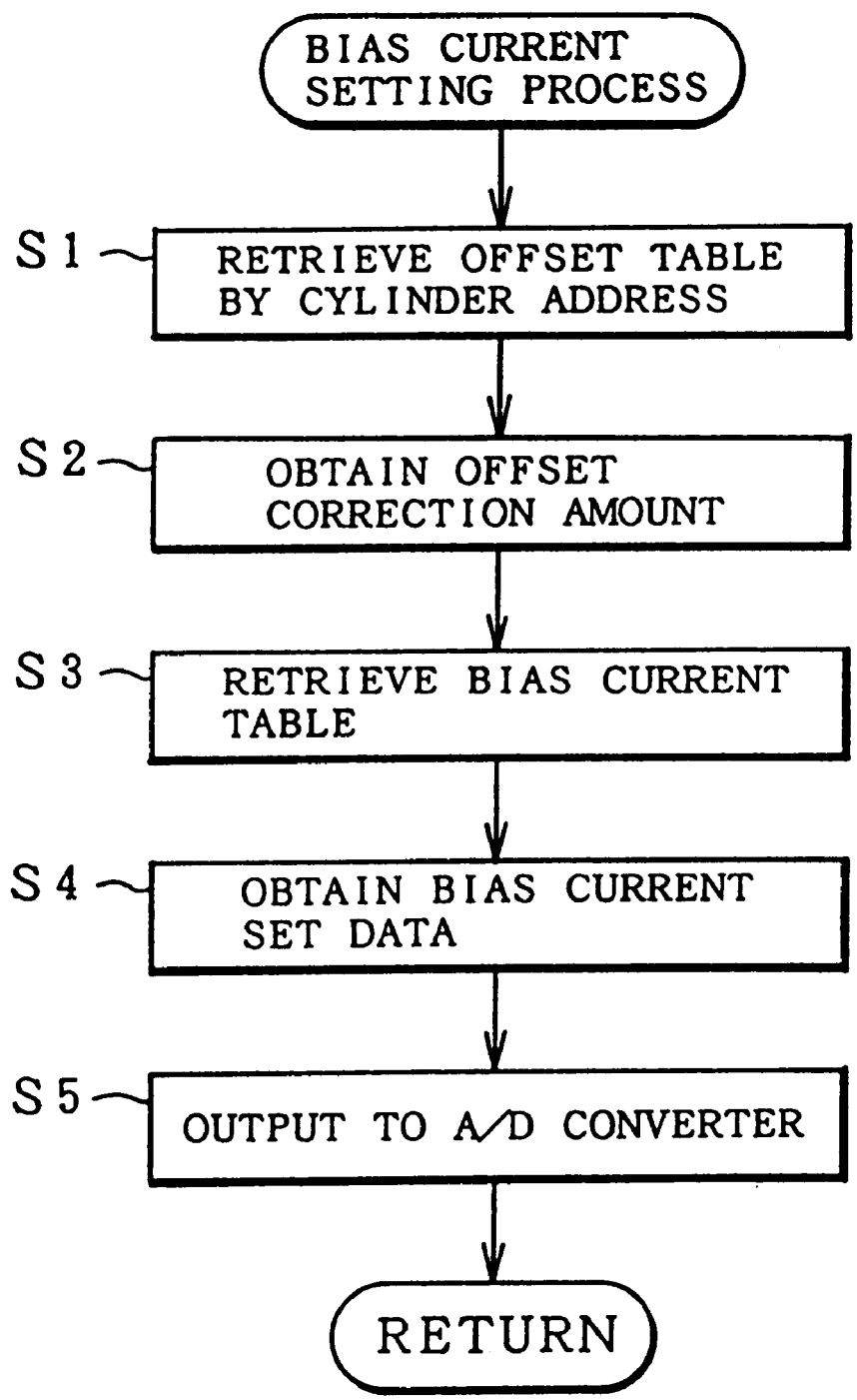
FIG. 12 is a flowchart for a bias current setting process of the invention.

FIG. 12 shows a setting process of the bias current to eliminate the upper/lower asymmetry of the MR head in step S4 in FIG. 11. This process corresponds to a converting process using the offset table 136 and bias current table 140 in FIG. 7. First in step S1, the offset table 136 is retrieved by the designated cylinder address CC and head number HH. In step S2, the corresponding offset correction amount is extracted. Subsequently, in step S3, the bias current table 140 is referred by the offset correction amount obtained in step S2 and the designated head number HH. The corresponding bias current set data is obtained in step S4. In step S5, finally, the bias current set data is outputted to the D/A converter 56, thereby allowing the bias current setting circuit 58 to supply the bias current to the MR head.

Figure 13:
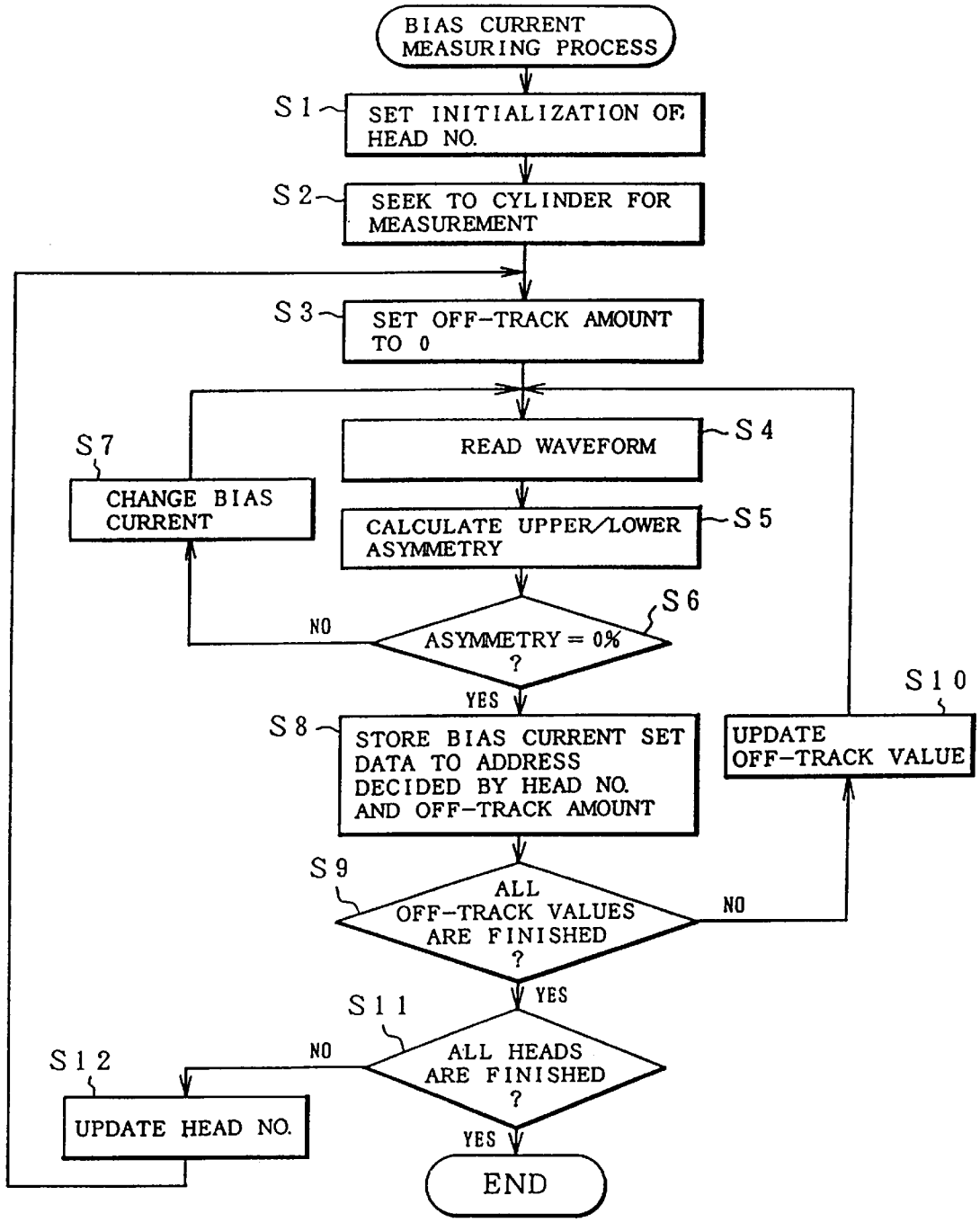
FIG. 13 is a flowchart for a bias current measuring process of the invention.
Figure 14:
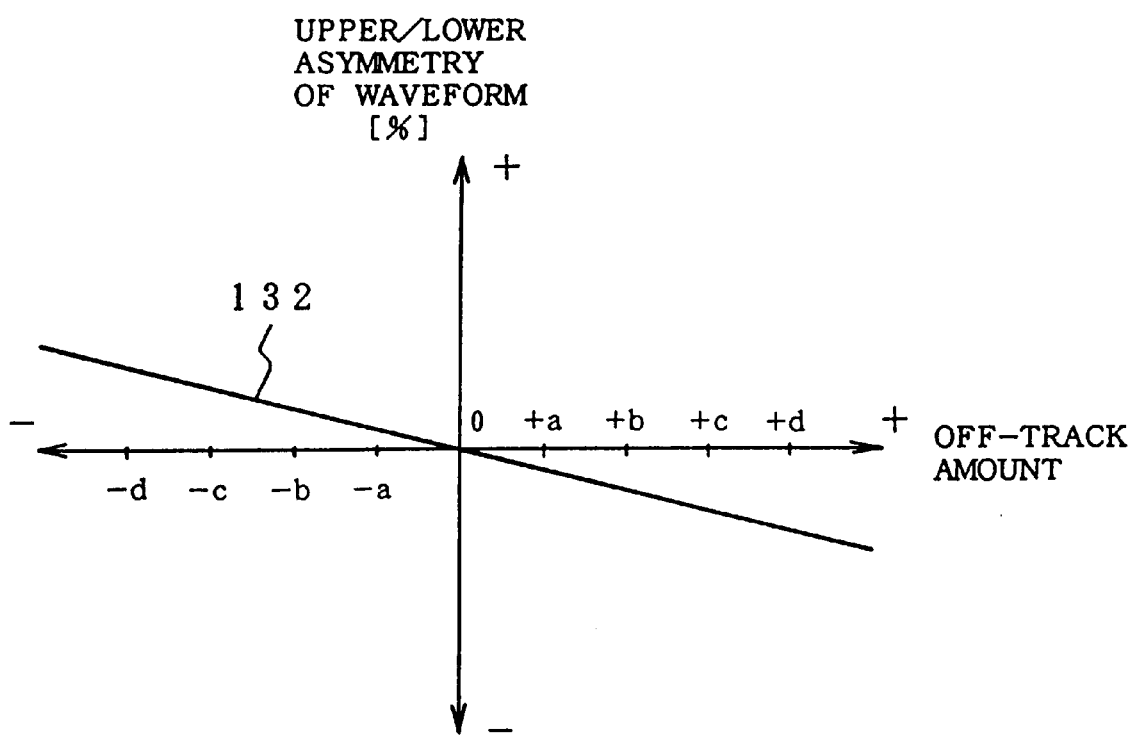
FIG. 14 is a characteristics diagram of an upper/lower symmetry of an MR head read waveform for an offset amount.

FIG. 13 shows a bias current measuring process to form the bias current table 140 which is used in the magnetic disk apparatus of the invention. In the bias current measuring process, the magnetic disk apparatus is connected to the tester and measuring instrument in the final step at the manufacturing stage of the magnetic disk apparatus and is made operative in an interlocking manner with the tester and measuring instrument, thereby executing the measuring process of the bias current. As for an evaluation of the asymmetry of the output waveform of the MR head in this case, the current set data for the D/A converter 56 is adjusted so that the value of the asymmetry Asym. which is given by the foregoing expression (1) is equal to 0%. In FIG. 14, a straight line 132 shows characteristics when the offset amount is changed to ±a, ±b, ±c, ±d, . . . from a state in which the bias current is adjusted so that the upper/lower asymmetry Asym. of the read waveform is equal to 0% in the on-track state in which the offset correction amount is set to 0. The occurrence of the offset corresponds to that the offset was corrected in the using state of the apparatus. The upper/lower asymmetry of the output waveform of the MR head occurs in accordance with the offset correction amount. In the bias current measuring process of FIG. 13, the bias current set data such that the upper/lower asymmetry is set to 0% in the on-track state in which the offset amount is equal to 0 is obtained and, after that, the apparatus is set to an offset seeking state while increasing the offset amount within a range from ±a to ±h, the bias current is changed so that the measured value of the upper/lower asymmetry Asym. in each offset seeking state is equal to 0%. The bias current set value when the upper/lower asymmetry is equal to 0% is obtained as measurement data.

In FIG. 13, first in step S1, an initial value HH-1 of the head number is set. In step S2, the combination head is sought to a specific cylinder for measurement in which a recording pattern for test has previously been written. Subsequently, in step S3, the offset amount is set to 0. In step S4, a read waveform from the MR head is read. In step S5, the upper and lower amplitude values A1 and A2 are obtained and the upper/lower asymmetry Asym. is calculated in accordance with the above expression (1). In step S6, a check is made to see if the upper/lower asymmetry is equal to 0% or not. In step S7, the processes in steps S4 to S6 are repeated until the asymmetry is equal to 0% while changing the bias current. When the upper/lower asymmetry is equal to 0% in step S6, set data of the bias current is stored into the table address decided by the head number HH and off-track amount 0 at that time in step S8. Subsequently, in step S9, a check is made to see if the measurement about all of the offset values of 0 to ±h has been finished or not. In step S10, the offset value is updated to the next value and the processes from step S4 are repeated. When the measurement regarding all of the offset values is finished, a check is made in step S11 to see if the measurement with respect to all of the heads has been finished or not. If NO, the head number is updated in step S12 and the processes from step S3 are repeated.

Figure 15:
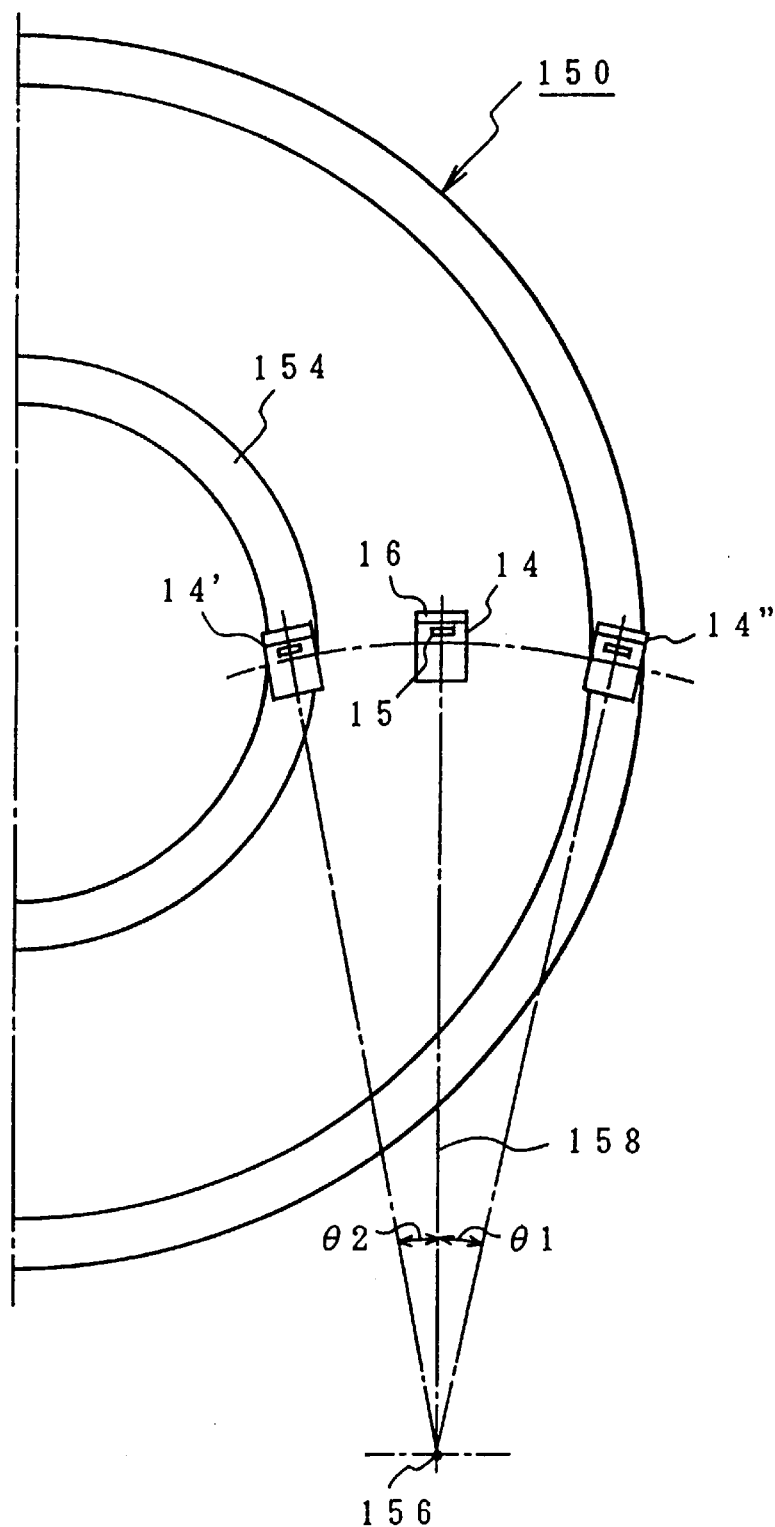
FIG. 15 is an explanatory diagram of a yaw angle offset.

In FIG. 15, the yaw angle offset of the combination head 14 as a measurement target in the yaw angle offset table measuring module 208 in FIG. 6 will now be explained. The actuator of the magnetic disk apparatus in which a write head 16 and a small MR head 15 are integratedly provided for a combination head 14 moves in the radial direction on the data surface of a disk medium 150 around a rotational center 156, thereby positioning the combination head 14 onto a track of an arbitrary cylinder address. In this instance, when comparing a case where the combination head 14 is positioned to a position 14' on the outermost side and a case where the head 14 is positioned to a position 14" on the innermost side, the position of the MR head 15 is deviated for the write head 16 in the on-track state. This is called a yaw angle offset. Namely, with respect to an outer maximum yaw angle θ1 for a center line 158 passing through the rotational center 156 of the head arm when the combination head 14 is moved to an edge portion on the inner side of the disk medium 150 and an inner maximum yaw angle θ2 in the opposite direction, a positional deviation occurs between the write head 16 and MR head 15 of the combination head 14.

Figure 16:
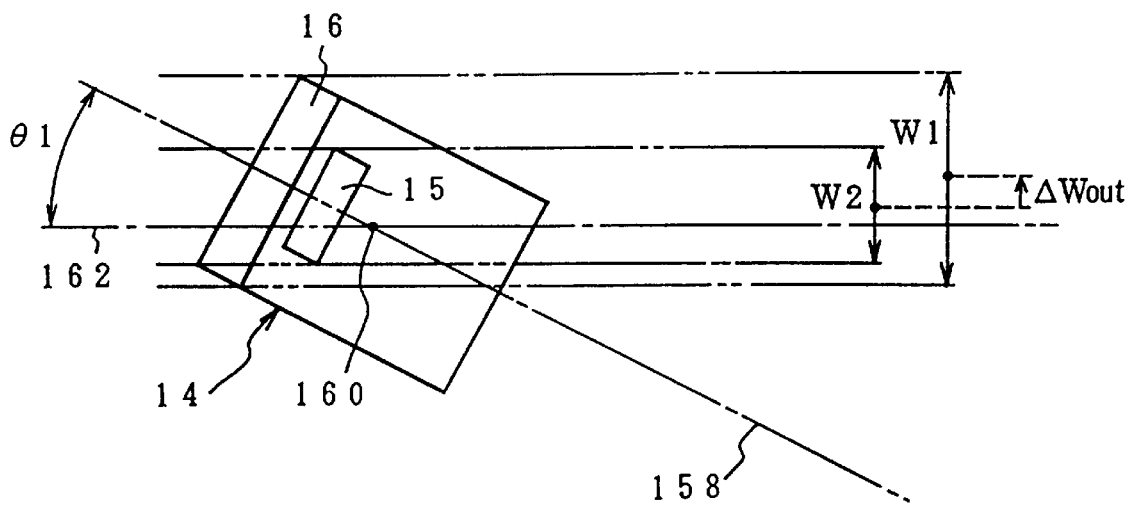
FIG. 16 is an explanatory diagram of a yaw angle offset on the outer side.

FIG. 16 shows a state of the yaw angle θ1 in which the combination head 14 moved to the outer side. A core width of the write head 16 provided for the combination head 14 is equal to, for example, about 6μm. A core width of the MR head 15 is equal to or less than 3 μm which is about half or less than that of the write head 16. The combination head 14 allows a head center 160 to be located in an on-track manner to a track center line 162 on the servo surface on the basis of the servo information on the servo surface. That is, the MR head 15 is located at a position out of the center of the track written by the write head 16. Such an offset Wout has a relation which is almost proportional to the yaw angle θ1. Therefore, in order to position the MR head 15 to the center of a recording track width W1 by the write head 16 in the reading operation, the MR head has to be offset by an amount of ΔWout to the outer side.

Figure 17:
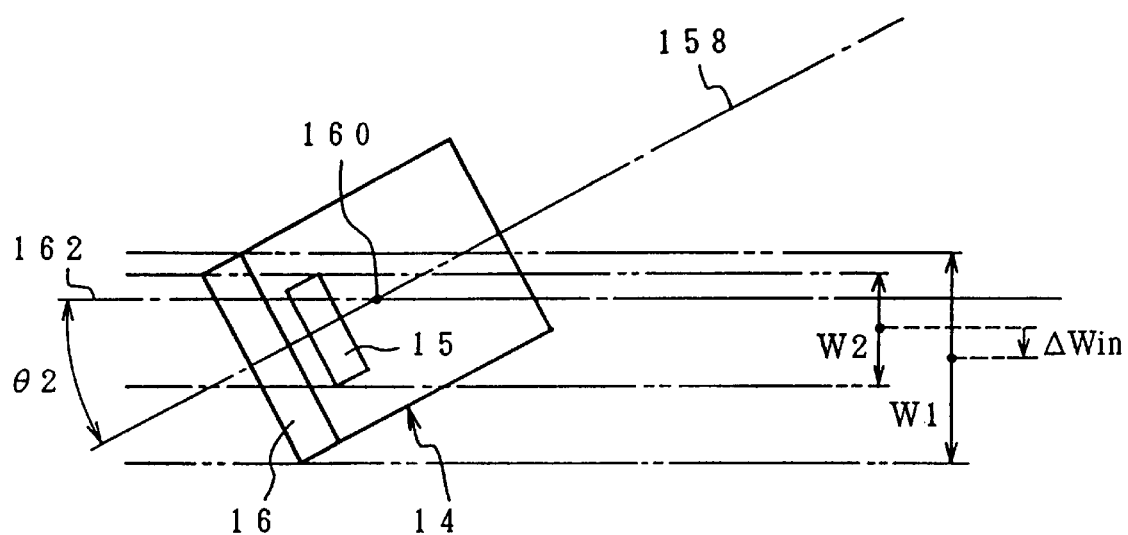
FIG. 17 is an explanatory diagram of a yaw angle offset on the inner side.

FIG. 17 shows a state in which the write head 16 is positioned to the inner maximum yaw angle θ2 in FIG. 15. In such a case as well, a center of a read track width W2 by the MR head 15 has a deviation of ΔWin for the center of the recording track width W1 by the write head 16. Such a deviation results in a yaw angle offset and has a value which is almost proportional to the yaw angle θ2. Therefore, at the time of the reading operation by the MR head 15, by executing the offset correction such that the MR head 15 is deviated in the inner direction by only the yaw angle offset ΔWin, the center of the read track width W2 of the MR head 15 can be positioned to the center of the recording track width W1 by the write head 16. In order to measure the yaw angle offset, the servo information to measure the head position is previously stored in a specific vacant cylinder of each of an inner guard band region 154 and an outer guard band region 152 of the data surface of the disk medium 150 in FIG. 15.

Figure 18:
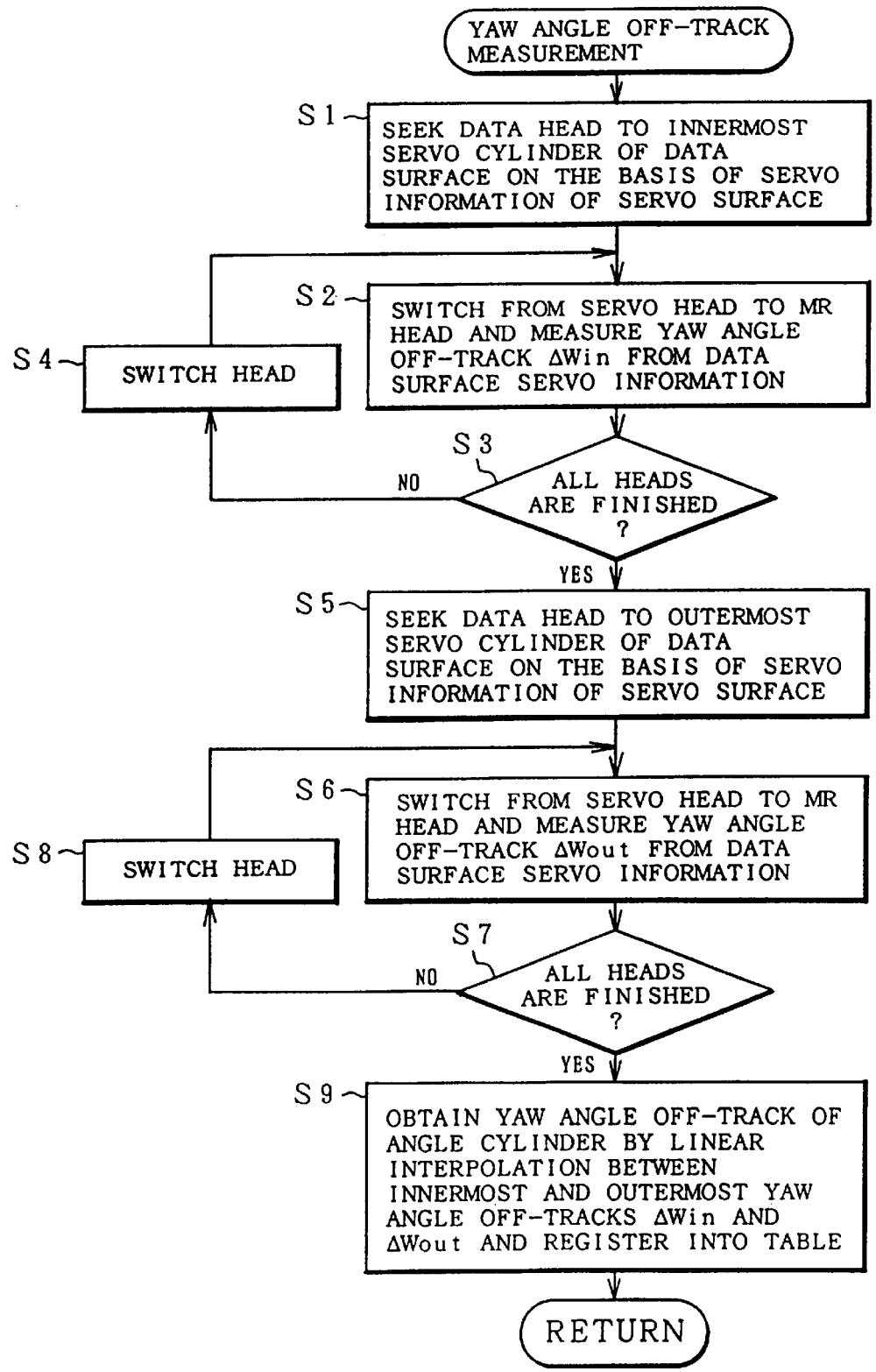
FIG. 18 is a flowchart for a yaw angle offset measuring process of the invention.
Figure 19:
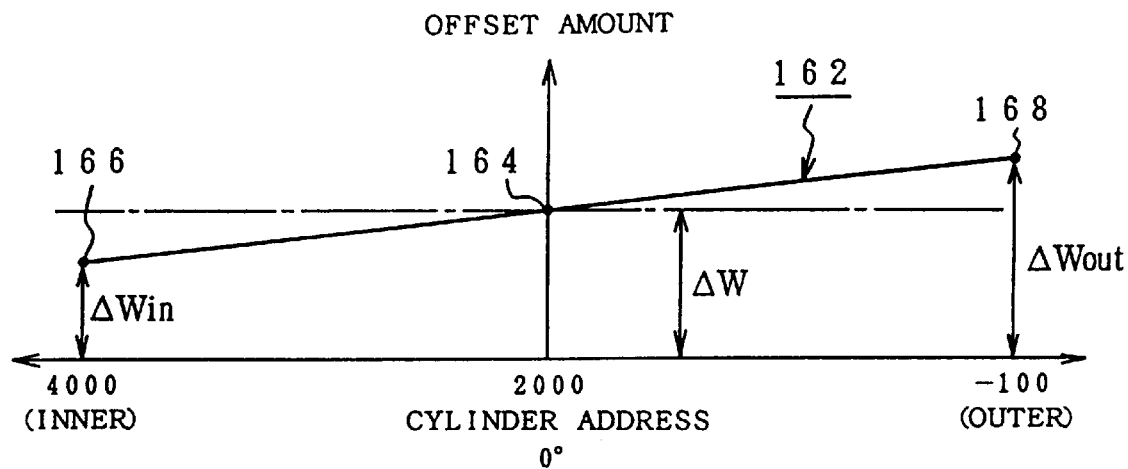
FIG. 19 is an explanatory diagram of an interpolating process of the yaw angle offset.

FIG. 18 shows a flowchart for the measuring process by the yaw angle offset table measuring module 208 of the invention. First in step S1, on the basis of the servo information of the servo surface, the combination head as a measuring target is sought to a specific cylinder of the inner guard band region 154 on the innermost side of the data surface. In step S2, the yaw angle offset ΔWin is measured on the basis of the servo information from the inner guard band region 154 of the data surface read out by the combination head. Such a yaw angle offset ΔWin is the measured value itself of the head position demodulated from the servo information of the combination head. In step S3, subsequently, a check is made to see if the measurement of the yaw angle offset on the inner side with respect to all of the heads has been finished or not. If NO, the head is switched in step S4 and the yaw angle offsets on the inner side are measured with respect to all of the heads. When the yaw angle offset measurement on the inner side is finished, the combination head is again sought to a specific cylinder of the outer guard band region 152 on the outermost side on the basis of the servo information of the servo surface in step S5. In step S6, the head is switched from the servo head to the MR head and the yaw angle off-track ΔWout on the outer side is measured from the servo information of the data surface. The yaw angle off-track ΔWout on the outer side is also the position information itself of the MR head demodulated from the servo information. The above processes are repeated while switching the heads in step S8 until the processes regarding all of the heads are finished in step S3. Finally, in step S9, the yaw angle offset at each cylinder position is calculated as shown in FIG. 19 by a linear interpolation between the innermost and outermost yaw angle offsets ΔWin and ΔWout and is stored into the offset table. In the case where the offset is obtained every cylinder zone, the yaw angle offset of the center cylinder in each zone is calculated by the linear interpolation and is stored into the offset table.

Figure 20:
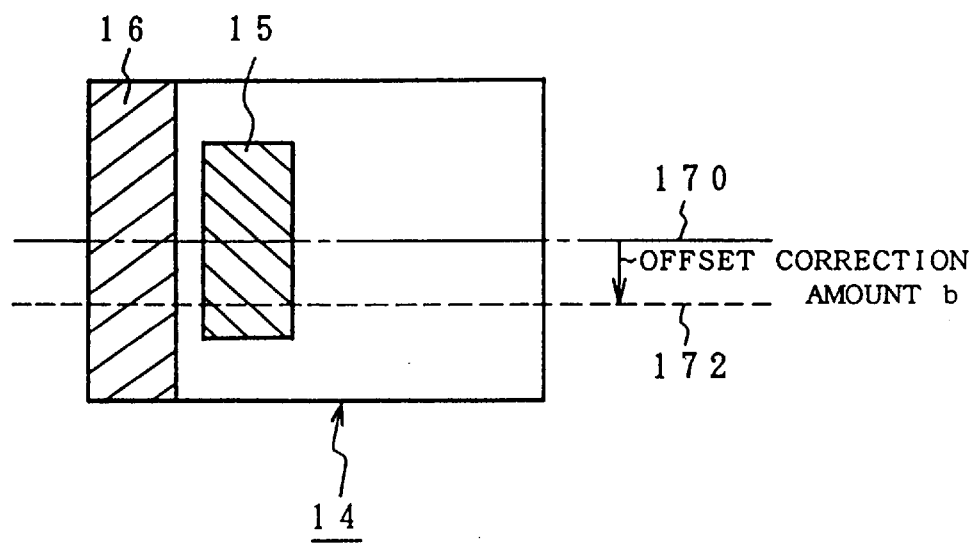
FIG. 20 is an explanatory diagram of a thermal offset.

In FIG. 20, the offset measurement by the thermal offset measuring module 210 in FIG. 6 will now be explained. The write head 16 and MR head 15 are provided for the combination head 14. The servo surface on which the servo information to control the head position has been recorded is physically away from the data surface provided with the combination head 14 by a rotary axis of a spindle motor. Their positions mechanically differ due to a thermal expansion by a temperature in the magnetic disk apparatus. For example, a head core center line 170 of the combination head 14 is deviated from a track center line 172 of the servo head as shown in the diagram. Such a deviation is called a thermal offset. Therefore, in order to match the head core center line 170 with the servo head track center line 172, it is sufficient to correct the offset by an amount of a thermal offset (b). Further, since the thermal offset has a time-dependent change for a period of time until the internal temperature becomes stable after the power source of the magnetic disk apparatus was turned on, after completion of the power-on start, a calibration to measure the thermal offset, namely, what is called a thermal offset measuring process is executed at regular time intervals.

Figure 21:
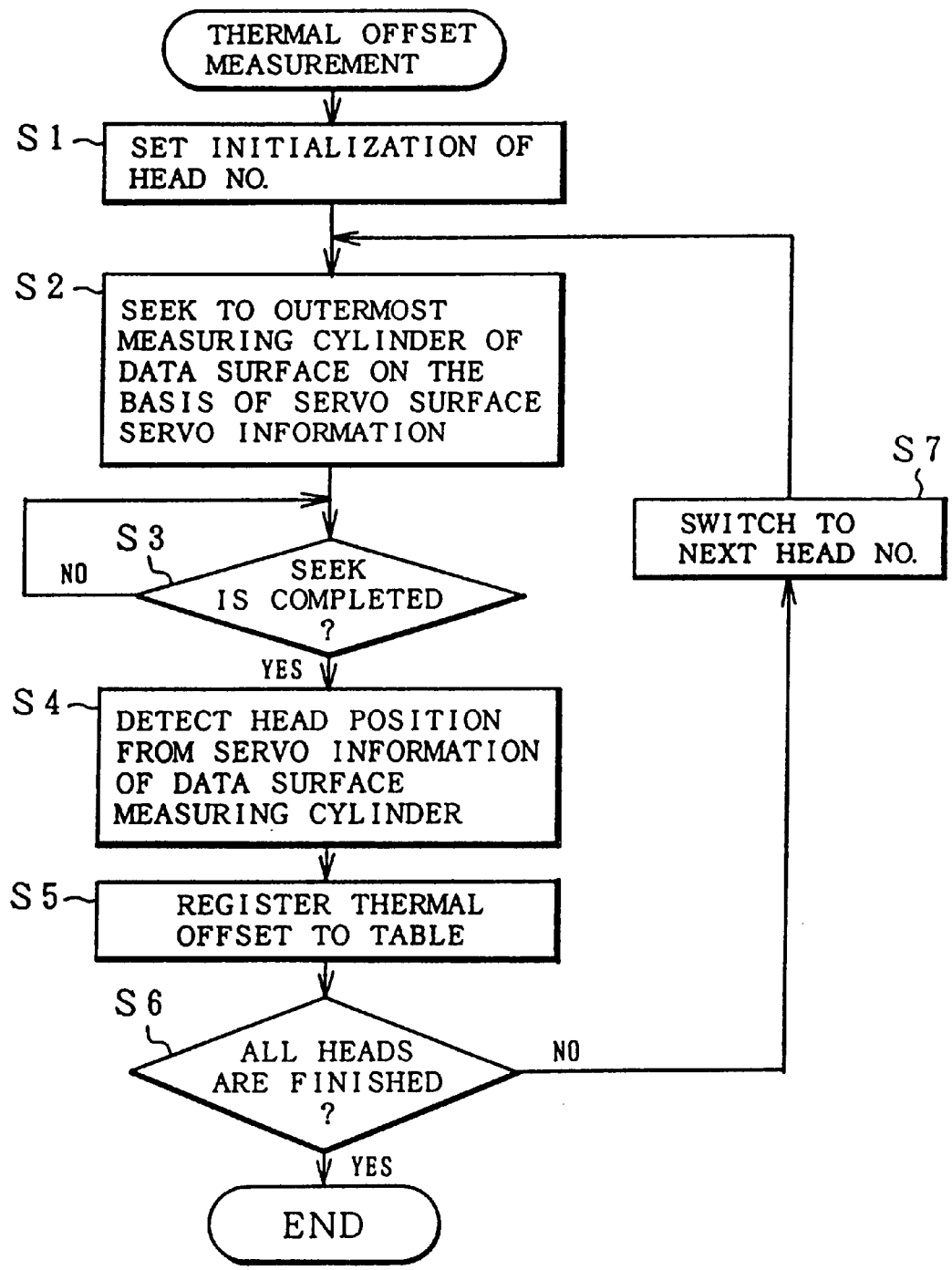
FIG. 21 is a flowchart for a measuring process of the thermal offset of the invention.

FIG. 21 shows a flowchart for the thermal offset process in the invention. In order to measure the thermal offset, the servo information recorded on the specific cylinder of the outer guard band region 152 of the disk medium 150 in FIG. 15 is used. First, in step S1, an initial value of the head number is set. In step S2, the combination head is sought to a specific cylinder of the outer guard band region on the outermost side of the data surface on the basis of the servo information of the servo surface. When the seeking operation to the specific cylinder is finished in step S3, the head position is detected from the servo information of the specific cylinder of the data surface in step S4. In step S5, such a value is registered as a thermal offset into the offset table. A check is made in step S6 to see if the processes for all of the heads have been finished or not. If NO, the head number is switched to the next head number in step S7 and processes similar to those mentioned above are repeated.

Figure 22:
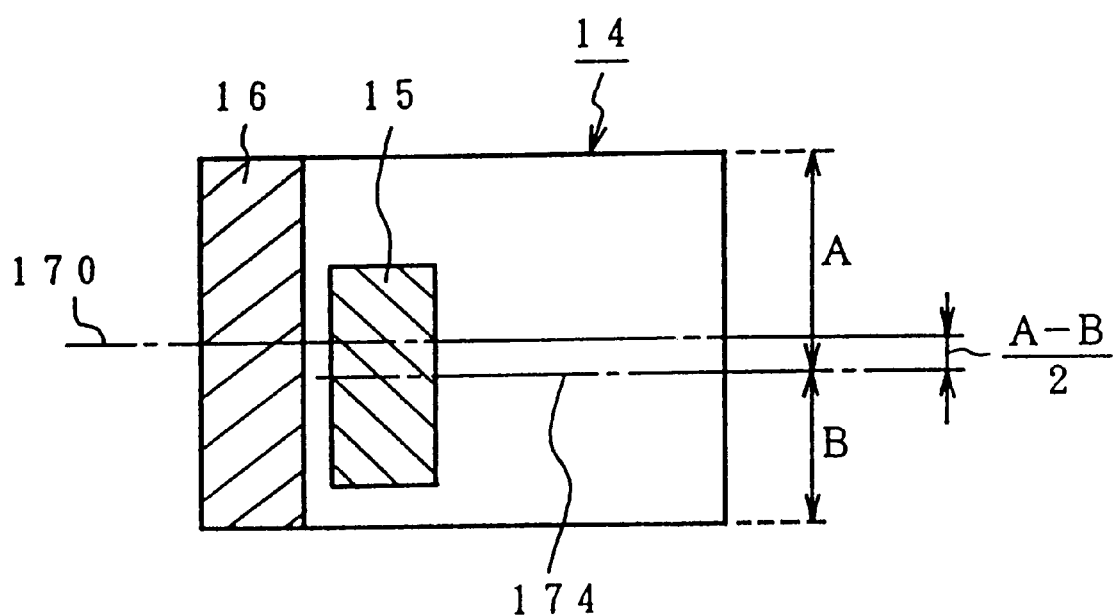
FIG. 22 is an explanatory diagram of a core deviation offset.

In FIG. 22, a measuring process of the core deviation offset by the core deviation offset measuring module 212 in FIG. 6 will now be described. The write head 16 as an inductive head and the MR head 15 which is used as a read head are integratedly formed on the combination head 14 by a thin film forming technique. However, there is a positional deviation between the head core center line 170 of the write head 16 and the head core center line 174 of the MR head 15. Such a deviation is called a core deviation offset. When there is such a core deviation offset, even if the same on-track control is performed for the head core center line 170 serving as a recording track center of the data surface recorded by the write head 16 in the reading operation, the MR head 15 is deviated by a distance of only the head core center line 170. Therefore, when considering that the characteristics of the magnetic field (H) for the MR head 15 of the recording track become the optimum characteristics at the track center, such characteristics are out of the optimum characteristics. By correcting the core deviation offset and matching the head core center line 174 of the MR head 15 with the head core center line 170 of the recording track, namely, the track center line upon reading operation, the magnetic field (H) for the MR head 15 of the recording magnetic field is set to the optimum characteristics, thereby enabling a conversion efficiency to be raised. According to the measurement of the core deviation offset of the MR head 15 for the write head 16 as mentioned above, the measurement pattern is written by the write head 16 in a state in which the combination head is on-track controlled to an arbitrary measurement track on the basis of the servo information of the servo surface. Subsequently, the operation is switched to the reading operation using the MR head 15 and the amplitude of the read waveform is measured while offset seeking to the inner and outer directions by a micro distance at a time, thereby obtaining the offset amount whose value is equal to or less than a threshold value at which the MR head 15 is removed from the recording track. In principle, widths (A) and (B) until the MR head 15 reaches both edges of the recording track width of the write head 16 by the offset seeking are measured. When the values of (A) and (B) can be measured, a core deviation offset (c) indicative of a positional deviation of the head core center lines 170 and 174 of the write head 16 and MR head 15 can be obtained by the following equation.

$$c=(A+B)/2-B=(A-B)/2$$

Figure 23:
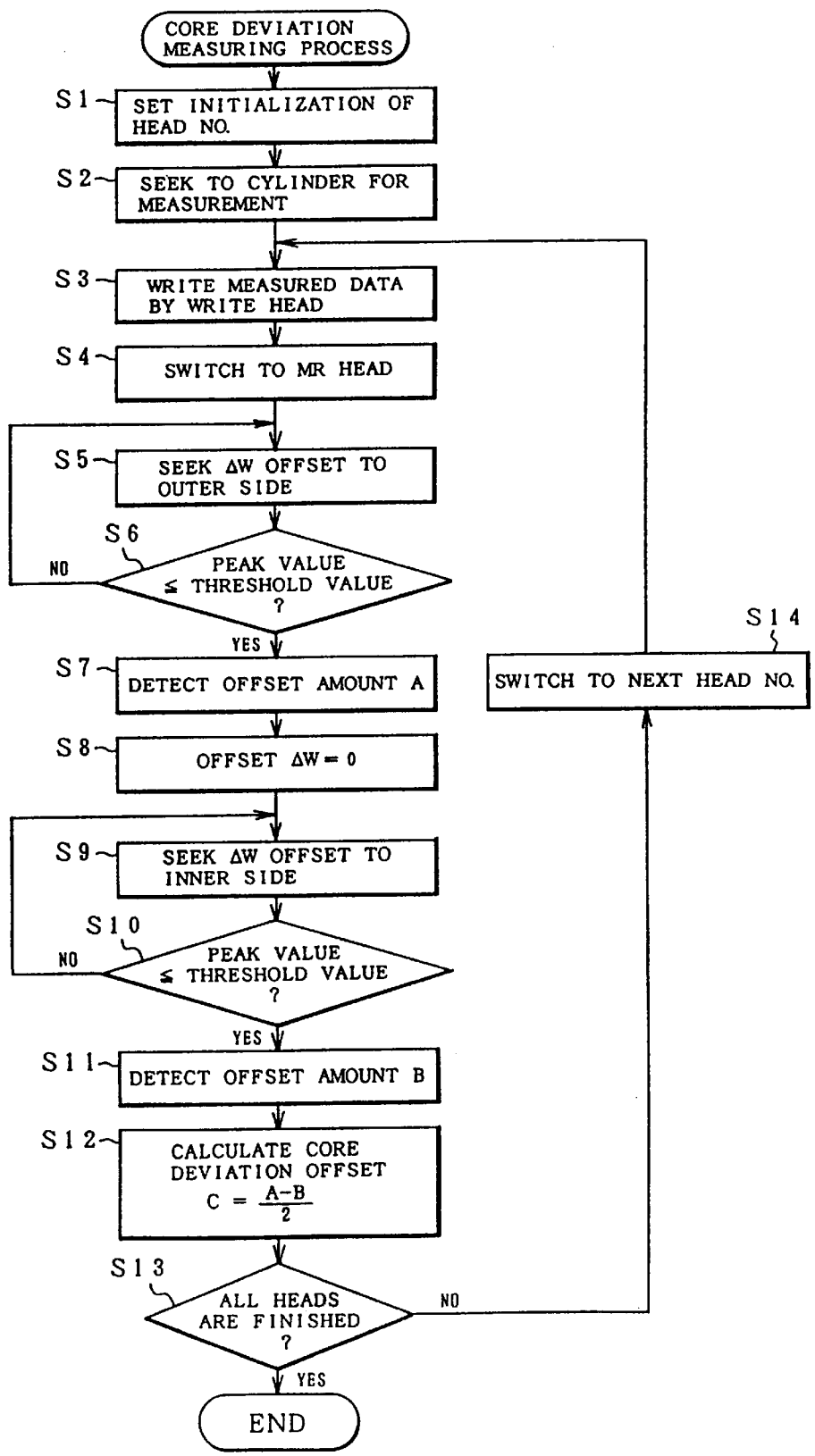
FIG. 23 is an explanatory diagram of a measuring process of the core deviation offset of the invention.

FIG. 23 is a flowchart for a measuring process of the core deviation offset based on the measurement principle in FIG. 22. First, in step S1, an initial value of the head number is set. In step S2, the combination head of the measured head number is sought to an arbitrary measurement cylinder. In step S3, the measured data is written by the write head. In step S4, the head is switched to the MR head and the recorded measured data is read out. In such a state, the head is offset sought by only ΔW on the outer side in step S5. A check is made in step S6 to see if a peak value of the read waveform of the MR head is equal to or less than a predetermined threshold value or not. The offset seeking operation to the outer side in step S5 is repeated until the peak value is equal to or less than the threshold value. When the peak value of the read waveform of the MR head is equal to or less than the threshold value, in step S7, an offset amount (A) so far is detected and held. Subsequently, in step S8, the offset ΔW is again returned to 0. In step S9, on the contrary, the offset seeking operation of ΔW is executed to the inner side. In step S10, the offset seeking operation by every ΔW is repeated until the peak value of the read waveform of the MR head is equal to or less than the threshold value. When the peak value of the read waveform is equal to or less than the threshold value in step S10, in step S11, an offset amount (B) to the inner side so far is detected and held. Subsequently, in step S12, the core deviation offset (c) is calculated from the offset amounts (A) and (B) until the peak value which is equal to or less than the threshold value on the inner and outer sides. In step S13, a check is made to see if the processes regarding all of the heads have been finished or not. If NO, the head number is switched to the next head number in step S14 and the processes from step S3 are repeated.

Figure 24:
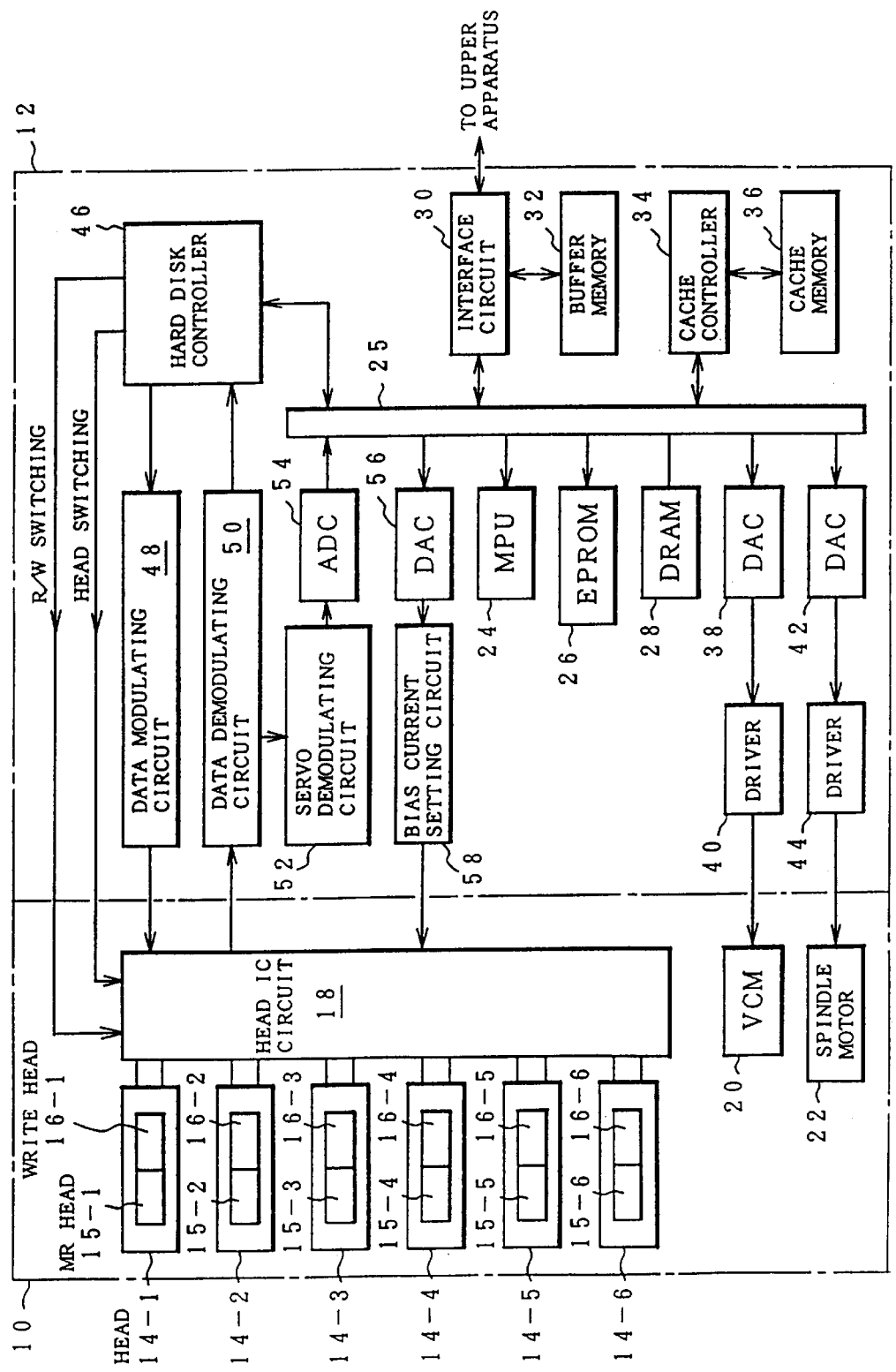
FIG. 24 is a block diagram of an embodiment of the invention according to the data surface servo method.

FIG. 24 shows another embodiment of the magnetic disk apparatus of the invention and is characterized in that the data surface servo method (embedded servo method) is used. According to the data surface servo method, the servo surface on which servo information has been recorded and the servo head are unnecessary and, for example, the combination heads 14-1 to 14-6 corresponding to six data surfaces provided for three disks are arranged for the disk enclosure 10. The servo demodulating circuit 52 of the drive controller 12 fetches the servo information obtained from the read waveform from the MR head of the data demodulating circuit 50 and demodulates the head position. As for the magnetic disk apparatus according to such a data surface servo method, when the offset correction is performed by using the offset amount of the offset table 136 by the head position controller 200 shown in FIG. 6, a set value of the bias current to eliminate the upper/lower asymmetry of the read waveform is read out from the bias current table 140 by the MPU 24, so that an optimum bias current is supplied to the MR head 15 by the bias current setting circuit 58.

FIG. 25 shows the offset table 136 which is used in the magnetic disk apparatus of the data surface servo method in FIG. 24. In the offset table 136 of the data surface servo method, since it is unnecessary to measure the thermal offset based on the servo information of the servo surface, a total value obtained by adding the yaw angle offset aij and core deviation offset cij is stored. FIG. 26 shows the offset table 144 which is used for the writing operation of the data surface servo method in FIG. 24. Since the core deviation offset cij is not needed for the writing operation, the table 144 is the offset table of only the yaw angle offset aij.

Figure 27:
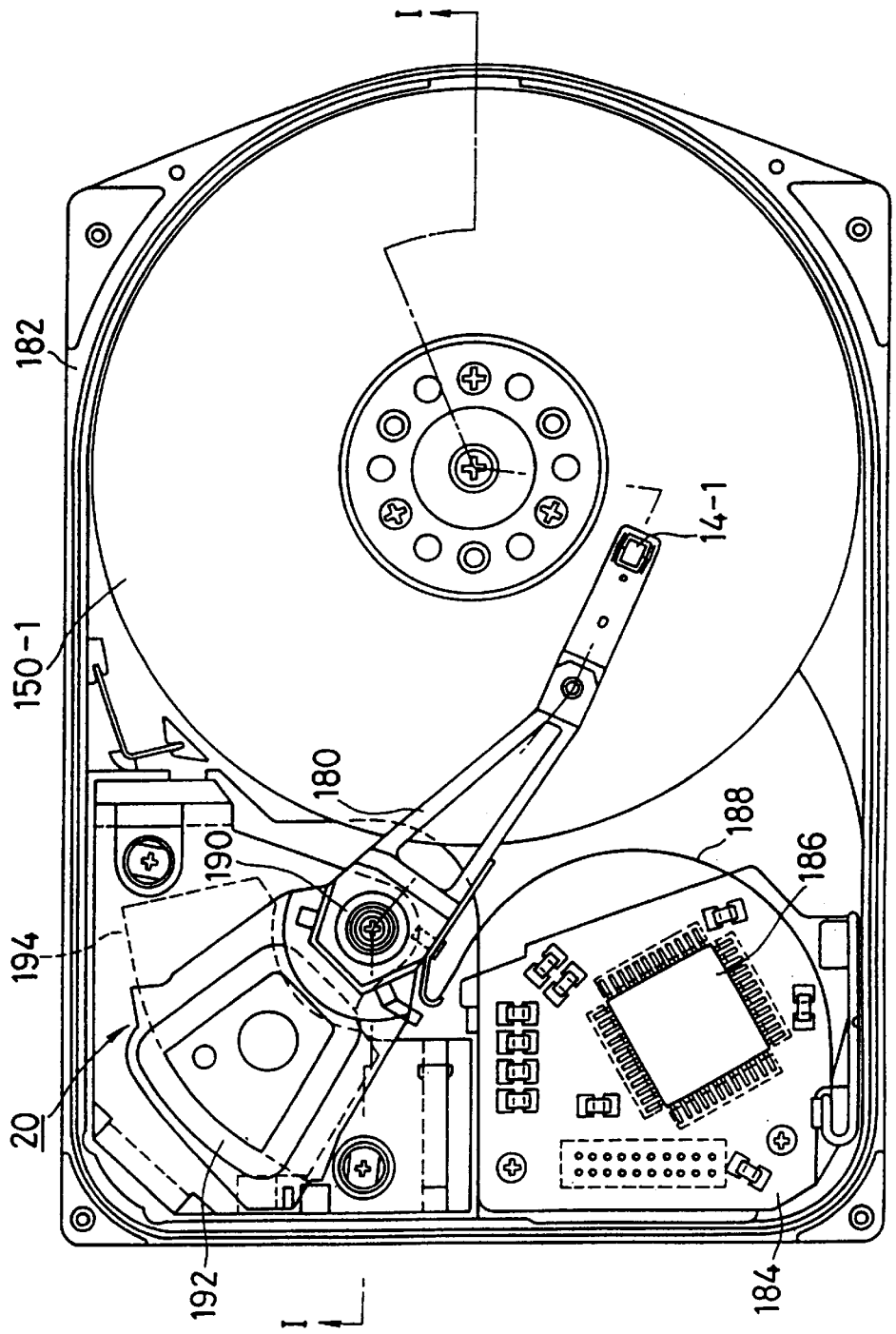
FIG. 27 is an explanatory diagram of an internal structure of a magnetic disk apparatus of the invention.

A construction in which a parameter peculiar to the MR head provided for the combination head is stored and held in a circuit unit of the head assembly which is used in the magnetic disk apparatus of the invention will now be described. FIG. 27 is an explanatory diagram of an internal structure of the magnetic disk apparatus of the invention. The disk medium 150-1 which is rotated by a spindle motor is enclosed in a housing 182 of the magnetic disk apparatus. As shown in FIG. 28 showing a cross sectional view taken along the line I—I in FIG. 27, three disks 150-1 to 150-3 are provided. Among the medium surfaces of those three disks 150-1 to 150-3, according to the servo surface servo method, one surface is used as a servo surface and the other remaining surfaces are used as data surfaces. According to the data surface servo method, all of the surfaces are used as data surfaces. For the disks 150-1 to 150-3, an actuator 180 is rotatably provided around an axis 190 as a center from a corner portion of the housing 182. The combination head 14-1 is attached to an edge of an arm of the actuator 180. As will be obviously understood from FIG. 28, the remaining combination heads are provided in correspondence to each data surface. The VCM 20 is provided for the rear side of the axis 190 of the actuator 180. The VCM 20 has a movable coil 192 on the actuator 180 side, thereby fixing a magnet 194 to a housing 182 side. Further, a circuit unit 186 is mounted to the side surface of the actuator 180 of the housing 182 by a flexible printed board 184. A signal line pattern from the circuit unit 186 is connected to the actuator 180 by a band 188 of the flexible printed board 184. The number of connections of signal lines with a plurality of combination heads including the combination head 14-1 and the number of supplying times of the bias current to the MR head of the combination head are counted. Further, as for the MR head, since a voltage is applied to the head itself by the supply of the bias current, in order to prevent a phenomenon such that when the head is come into contact with the disk 150-1 side, a short-circuited current flows and a head breakage occurs, the bias current is also applied to the disks 150-1 to 150-3 through the housing 182.

Figure 29:
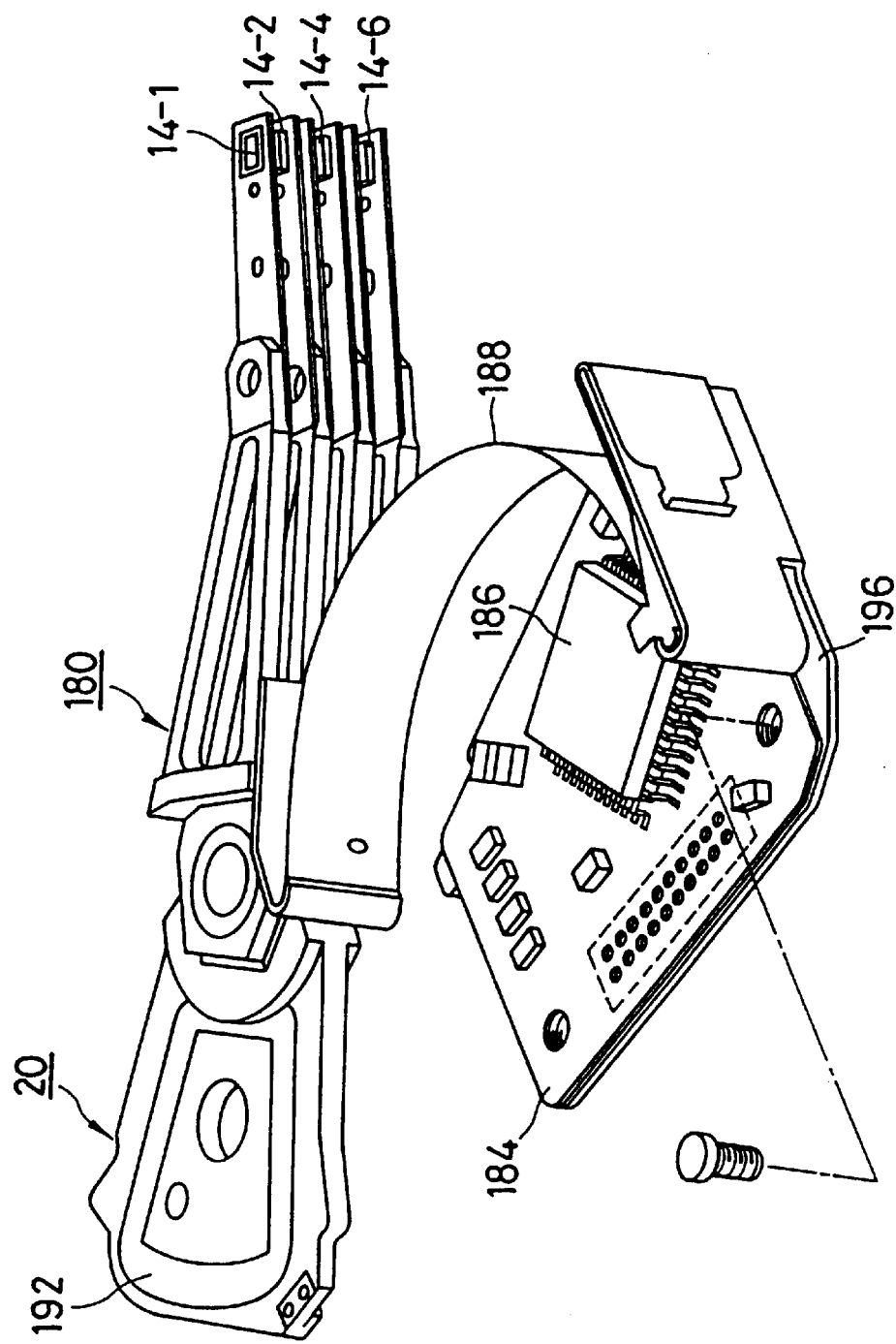
FIG. 29 is an explanatory diagram of a head assembly of the invention.

FIG. 29 shows a head assembly which is used in the magnetic disk apparatus in FIGS. 27 and 28. The head assembly comprises: the actuator 180 having the combination heads 14-1 to 14-6 and movable coil 192 of the VCM 20; the flexible printed board 184 which is coupled to the actuator 180 by the band 188; and the circuit unit 186 installed on an attaching base 196 and the flexible printed board 184. In the circuit unit 186 of the flexible printed board 184, for example, a head IC circuit provided for the disk enclosure 10 in FIG. 2 is assembled. According to the invention, there is further provided a non-volatile memory such as an EEPROM or the like to store and hold parameters peculiar to the heads of the combination heads 14-1 to 14-6 provided for the actuator 180. In the non-volatile memory of the circuit unit 186, for example, values of the yaw angle offset aij and/or core deviation offset cij which are peculiar to the heads and are shown in the offset table 136 in FIG. 8 are stored as table information. Table information of the bias current set data in each offset amount to eliminate the upper/lower asymmetry of the read waveform corresponding to the head number of the bias current table 140 in FIG. 9 can be also stored.

Figures 30A, 30B:
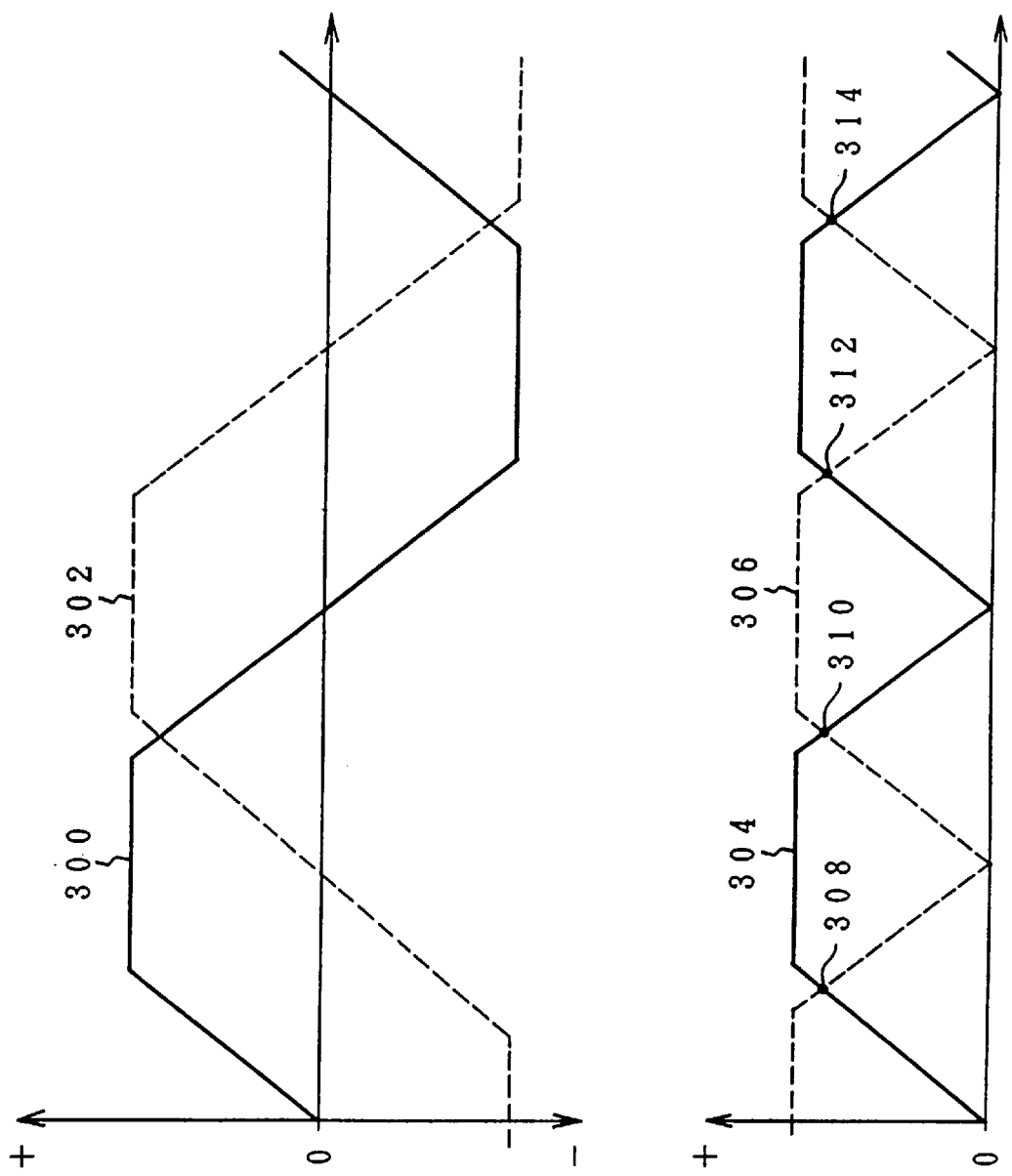
FIGS. 30A and 30B are timing charts of two-phase position signals when a detection value of a position sensitivity is measured.

Further, detection values of position sensitivities of every combination heads 14-1 to 14-6 are stored in the non-volatile memory of the circuit unit 186. To measure the position sensitivity, the actuator 180 is moved at a low speed and a 2-phase position (N) signal 300 and a 2-phase position (Q) signal 302 in FIG. 30A are formed from two variable gain amplifiers provided for amplification of the 2-phase position signal. Subsequently, the 2-phase position (N) signal 300 and 2-phase position (Q) signal 302 are transmitted through an absolute value circuit, thereby converting to an absolute value (N) signal 304 and an absolute value (Q) signal 306 in FIG. 30B. Further, a value of a crossing-point 308 of the absolute value (N) signal 304 and absolute value (Q) signal 306 is detected and stored as a position sensitivity detection value into the non-volatile memory of the circuit unit 186. As a detection value of the crossing-point, for example, a mean value of a plurality of crossing-points 308, 310, 312, 314, . . . is used. As mentioned above, the detection value of the position sensitivity stored in the non-volatile memory is read out upon reading operation. A gain of the variable gain amplifier to form the 2-phase position (N) signal 300 and 2-phase position (Q) signal 302 is adjusted so as to coincide with a reference level of a predetermined position sensitivity. Therefore, even if there is a variation of the sensitivity every head, the 2-phase position (N) signal 300 and 2-phase position (Q) signal 302 each having a constant level can be always obtained. As mentioned above, the data such as offsets, bias current set data, position sensitivity detection value, and the like which are peculiar to the MR heads of the combination heads 14-1 to 14-6 provided for the head assembly are previously stored and held in the circuit unit 186 of the head assembly which is used in the magnetic disk apparatus, so that the assembling adjustment in the sole head assembly can be realized at a stage before combining with the controller. Since the parameters peculiar to the heads exist on the assembly side, the offset correction according to the parameters peculiar to the head assembly and the setting of the bias current to eliminate the upper/lower asymmetry of the MR head can be performed without being restricted by the controller side. In the case where there is an abnormality on the control unit side at an examination stage, a head assembly having no problem is removed and can be easily combined with another control unit. Thus, a manufacturing yield in the manufacturing step of the magnetic disk control apparatus can be remarkably improved.

As mentioned above, according to the invention, when the offset correction is performed in the on-track control at the time of the reading operation by the MR head, the bias current to the MR head according to the offset correction amount is set, the upper/lower asymmetry which occurs by the offset correction of the MR head can be eliminated, the read waveform having no upper/lower asymmetry can be obtained, so that the error rate in the reading operation can be improved and the reliability of the memory apparatus can be raised.

The non-volatile memory is provided for the circuit unit of the head assembly on the disk enclosure side which is independently formed at the assembling stage of the memory apparatus such as a magnetic disk apparatus or the like and the parameters such as offset, bias current set data, and the like which are peculiar to the MR head are previously stored in the non-volatile memory, so that the yield in the manufacturing step of the memory apparatus and the performance can be improved. In the using state of the apparatus as well, it is possible to exchange and repair on a head assembly unit basis, so that a maintenance can be easily performed.

In the above embodiment, as an offset to decide the bias current for eliminating the offset correction and the upper/lower asymmetry of the MR head, the yaw angle offset, thermal offset, and core deviation offset have been used as examples. In addition to the above offsets, however, an eccentric correction offset to correct an eccentric component (run-out) of a spindle motor can be also included.

According to the above embodiment, although the offset table has been formed by the total offset amount obtained by adding a plurality of kinds of offsets, it is also possible that an independent offset table is formed every kind of offset, necessary offsets are read out and, after that, the read-out offsets are added, thereby performing the offset correction and the retrieval of the bias current correction table.

The embodiment has been described above with respect to the example of the magnetic disk apparatus for executing processes as a formatter under the control of the hard disk controller 46 on the disk drive side comprising the disk enclosure 10 and drive controller 12 and for perfectly performing the modulation of the write data and the reconstruction of the read data. The invention can be also applied as it is to a magnetic disk apparatus in which a formatter function is not provided on the disk driver side but is provided for an upper disk control apparatus and data is transmitted and received to/from the upper apparatus at a level of NZR data and the formatter function is performed in the upper disk control apparatus.

Further, the offset amount to be stored in the offset table 136 is measured at a predetermined timing. For example, the offset amount is measured at a proper timing such as timing for activation of the apparatus, timing for turn-on of the power supply, waiting time for a command from the upper apparatus, timing when the number of use times reaches a predetermined number or more, timing when a use time is equal to or longer than a predetermined time, same timing as the calibration, or the like. The offset amount can be also measured at any timing other than the above timings. The above point shall also similarly apply to data to be stored in the circuit unit 186 of the head assembly. Further, although the invention has been described as an example with respect to the magnetic disk apparatus or the like, the invention also includes a proper apparatus such as an optical disk apparatus or the like. The functions of the controller and modules which are realized by the program control of the MPU can be also realized by a hardware.

What is claimed is:

1. A memory apparatus using a disk medium, comprising:
    a plurality of combination heads each having a write head and a read head using an MR head;

an actuator for moving said combination head to an arbitrary position of a recording medium;

an offset table for storing an offset amount for each one of said plurality of combination heads;

a bias current table for storing an optimum bias current to eliminate an asymmetry of a read waveform of said MR head in correspondence to said offset amount stored in said offset table;

a head position controller for correcting a head position so as to eliminate the offset amount derived from said offset table when a selected one of said combination heads is positioned to said arbitrary position; and a bias current supply source for supplying a bias current, corresponding to the set value of the optimum bias current, read out from said bias current table with reference to the offset amount obtained from said offset table, to said MR head in an offset correction state of said head by said head position controller.

2. An apparatus according to claim 1, wherein a total amount of a plurality of kinds of offset amounts is stored in said offset table.

3. An apparatus according to claim 1, wherein in the case where said combination head is attached to an edge of a rotatable arm as said actuator, a yaw angle offset amount is stored in said offset table.

4. An apparatus according to claim 3, further having a yaw angle offset table measuring module for measuring said yaw angle offset;

and wherein said yaw angle offset table measuring module measures a deviation amount of a center position in a track direction of said MR head for a center position in the track direction of the write head provided for said combination head as a yaw angle offset amount for a yaw angle θ which is determined by each cylinder position by a rotation of said arm and stores into said offset table.

5. An apparatus according to claim 2, wherein a thermal offset indicative of a positional deviation of said combination head depending on an environment temperature of the apparatus is stored in said offset table.

6. An apparatus according to claim 5, wherein said head position controller uses a servo surface servo method whereby servo information of a servo surface of said disk medium is read out by a servo head and a head position is controlled, and servo information to detect the position of said combination head is recorded on a track at a specific cylinder position of each data surface of said disk medium, further comprising:

a thermal offset measuring module for measuring said thermal offset and storing said thermal offset into said offset table, and when said combination head is moved and positioned to a recording cylinder position of the servo information on said data surface of the basis of the servo information of said servo surface, said thermal offset measuring module detects the head position on the basis of the servo information read out by said MR head and stores said head position as a thermal offset amount into said offset table.

7. An apparatus according to claim 2, wherein a core deviation offset indicative of a deviation amount of a center position of said MR head for said write head provided integratedly for said combination head is stored in said offset table.

8. An apparatus according to claim 7, further having a core deviation offset measuring module for measuring said core deviation offset and storing into said offset table, wherein said core deviation offset measuring module measures a deviation amount of the center position of said MR head for a center position of said write head and stores the offset amount into said offset table.

9. An apparatus according to claim 1, wherein an offset value is stored in said offset table in correspondence to a head number and a cylinder address.

10. An apparatus according to claim 1, wherein an offset value is stored in said offset table in correspondence to a head number and an address of a cylinder zone in which a predetermined number of cylinders are grouped.

11. An apparatus according to claim 1, wherein the offset amount to be stored in said offset table is measured at a predetermined timing.

12. An apparatus according to claim 11, wherein the offset amount to be stored in said offset table is measured at a proper timing such as upon activation of the apparatus, turn-on of a power source, waiting time for a command from an upper apparatus, after a predetermined number of read or write operations, after reading or writing for a predetermined length of time, or upon calibration of said apparatus.

* * * * *

UNITED STATES PATENT AND TRADEMARK OFFICE
CERTIFICATE OF CORRECTION

PATENT NO. : 6,078,454
DATED : June 20, 2000
INVENTOR(S) : Takahashi et al.

It is certified that error appears in the above-indentified patent and that said Letters Patent is hereby corrected as shown below:

Column 19, line 22, please delete "1" and insert --2-- therefor

Signed and Sealed this

Twenty-second Day of May, 2001

Attest:

NICHOLAS P. GODICI

Attesting Officer        Acting Director of the United States Patent and Trademark Office